United States Patent
Dholakia et al.

(10) Patent No.: US 9,568,741 B2
(45) Date of Patent: Feb. 14, 2017

(54) OPTICAL EIGENMODE IMAGING

(75) Inventors: Kishan Dholakia, Fife (GB); Jorg Baumgartl, Fife (GB); Michael Mazilu, Fife (GB); Anna Chiara De Luca, Fife (GB)

(73) Assignee: University Court of The University of St Andrews (GB)

( * ) Notice: Subject to any disclaimer, the term of this patent is extended or adjusted under 35 U.S.C. 154(b) by 884 days.

(21) Appl. No.: 13/640,453

(22) PCT Filed: Apr. 13, 2011

(86) PCT No.: PCT/GB2011/000580
§ 371 (c)(1),
(2), (4) Date: Feb. 21, 2013

(87) PCT Pub. No.: WO2011/135278
PCT Pub. Date: Nov. 3, 2011

(65) Prior Publication Data
US 2013/0173194 A1    Jul. 4, 2013

(30) Foreign Application Priority Data

Apr. 13, 2010  (GB) .................................. 1006122.4
Jun. 11, 2010  (GB) .................................. 1009808.5

(51) Int. Cl.
*G06F 17/11*    (2006.01)
*G02B 27/58*    (2006.01)

(52) U.S. Cl.
CPC ......... *G02B 27/58* (2013.01); *G02B 2207/125* (2013.01)

(58) Field of Classification Search
CPC ... G02B 2207/125; G02B 27/58; G01R 33/46; G01R 33/54; G01R 33/583; G06K 7/10702
USPC .............. 702/71, 72, 73; 250/505.1, 462.45; 324/314; 372/30; 235/454
See application file for complete search history.

(56) References Cited

U.S. PATENT DOCUMENTS 6,073,851 A * 6/2000 Olmstead ........... G06K 7/10702
                                                        235/454
7,023,208 B2 * 4/2006 Kurimoto ............ G01R 33/583
                                                          324/307
2009/0230333 A1   9/2009 Eleftheriades

OTHER PUBLICATIONS

Stewart et al.: "Experimental demonstration of polarization-assisted transverse and axial optical superresolution"; Optics Communications, vol. 241, No. 4-6, Nov. 16, 2004, pp. 315-319.
(Continued)

*Primary Examiner* — John H Le
(74) *Attorney, Agent, or Firm* — Moore & Van Allen PLLC; W. Kevin Ransom

(57) ABSTRACT

A method of optimising at least one measure that is a quadratic function of a wavefunction, such as the spot size of a laser, the method comprising: superimposing a plurality of wavefunctions; determining a relationship between the superimposed wavefunctions and the quadratic measure, and using the determined relationship to identify the superimposed wavefunctions that provide a desired or optimised quadratic measure.

32 Claims, 18 Drawing Sheets

(56) References Cited

OTHER PUBLICATIONS

Berry, et al.: "Evolution of quantum superoscillations and optical superresolution without evanescent waves"; Journal of Physics A. Mathematical and General, vol. 39, Jun. 2, 2006, pp. 6965-6977.
Berry, et al.: Optical superoscillations; Lasers and Electro-Optics 2009 and the European Quantum Electronics Conference, Cleo Europe—EQEC 2009, Jun. 14, 2009, p. 1.
International Search Report and Written Opinion of PCT/GB2011/000580, dated Aug. 18, 2011.

* cited by examiner (a)

(b)

(c)

(d)

OPTICAL EIGENMODE IMAGING

FIELD OF THE INVENTION

The present invention relates to a system and method for using quadratic measure eigenmodes to manipulate waves, for example to achieve a desired characteristic. For example, the invention can be used allow optical spot sizes to be reduced below the so-called diffraction limit. Using spot sizes below the difraction limit has many advantages and applications. For example, it can enhance the excitation and collection of spectroscopic applications; improve the efficiency of sub-diffractive optical nano-surgery and optical micro-fabrication and allow imaging with sub-diffraction resolution.

BACKGROUND OF THE INVENTION

For over a century diffraction theory has been thought to limit the resolution of focusing and imaging in the optical domain. The diffraction limit originates from the Heisenberg uncertainty principle. The size of the smallest spot achievable is inversely proportional to the range of spatial wavevectors available. Recent work on band-limited functions oscillating faster than the highest Fourier components of which they are composed, so termed superoscillations, shows that there may be routes to sub-diffraction imaging in the optical far-field without the need to retain rapidly decaying evanescent waves. With superoscillations, however, sub-diffraction features are achieved at the expense of having most of the energy in low frequency Fourier features (sidebands) that have many orders of magnitude higher amplitude than any sub-diffractive feature that is to be utilised.

SUMMARY OF THE INVENTION

The present invention uses the superposition of wavefunctions to optimise at least one measure that is a quadratic function of a wavefunction. The quadratic measure may be selected from: spot size; energy; intensity; power; momentum; circular spin.

Optimisation is done by firstly determining the quadratic measure for superpositions with at least one wavefunction. Then the amplitude and/or phase (i.e complex amplitude) of each superposition and the quadratic measures are used to determine the linear relationship or function between them. The linear relationship or function can be subsequently used to determine the superposition that gives an optimised or desired measure. As a specific example, the measure may be spot size, and the linear relationship may be used to determine the minimum spot size.

The linear relationship may be decomposed or transformed to be represented by a series of eigenvectors/eigenvalues. The optimised or desired measure may be selected by, for example, choosing the maximum or minimum magnitude eigenvalue. This can then be used to determine the optimum superposition.

The linear function may be a linear operator. The linear operator may comprise a square matrix where each element is given by the quadratic measure corresponding to all the superpostions of the wavefunctions considered, to form a n by n matrix where n is the number of wavefunctions considered.

Constraints may be applied to the optimisation process. For example, one parameter may be constrained to be constant and another optimised within that constraint. For example, it may be a requirement for the intensity to be constant and for the spot size to be minimsed within that constraint.

The present invention is based on a superposition of fields that is optimised to achieve, for example a small spot size. Multiple techniques can be employed for the optimisation process ranging from a genetic algorithm to a steepest descent method.

Using the quadratic measure eigenmodes technique, which is simple and effective, the invention can provide directly sub-diffraction optical features in the far field. This technique can, with simple modifications, be applied to the optimisation of any quadratic measure originating from interfering fields or waves. The optimisation can be implemented using simple and robust optical components. It is compatible with any optical microscope system bringing sub-diffractive focal spots readily within reach of numerous applications.

According to an implementation of the invention, there is provided a method for forming an image comprising illuminating a target with a plurality of wavefunctions; capturing light that has interacted with the target; decomposing the captured light into a plurality of wavefunctions that together describe the target; determining a relationship between the superimposed wavefunctions and a quadratic measure; using the determined relationship to identify the superimposed wavefunctions that provide a desired or optimised quadratic measure, and using the identified superimposed wavefunctions to create an image of the target. The light captured may be transmitted through or reflected from or scattered from the target.

Using the method of the invention, fluctuations or perturbations of the incoming light field can be corrected and the quality of a laser beam improved.

Brief Description of the Invention

Various aspects of the invention will now be described by way of example only and with reference to the accompanying drawings, of which:

Detailed Description of the Drawings

Figure 1:
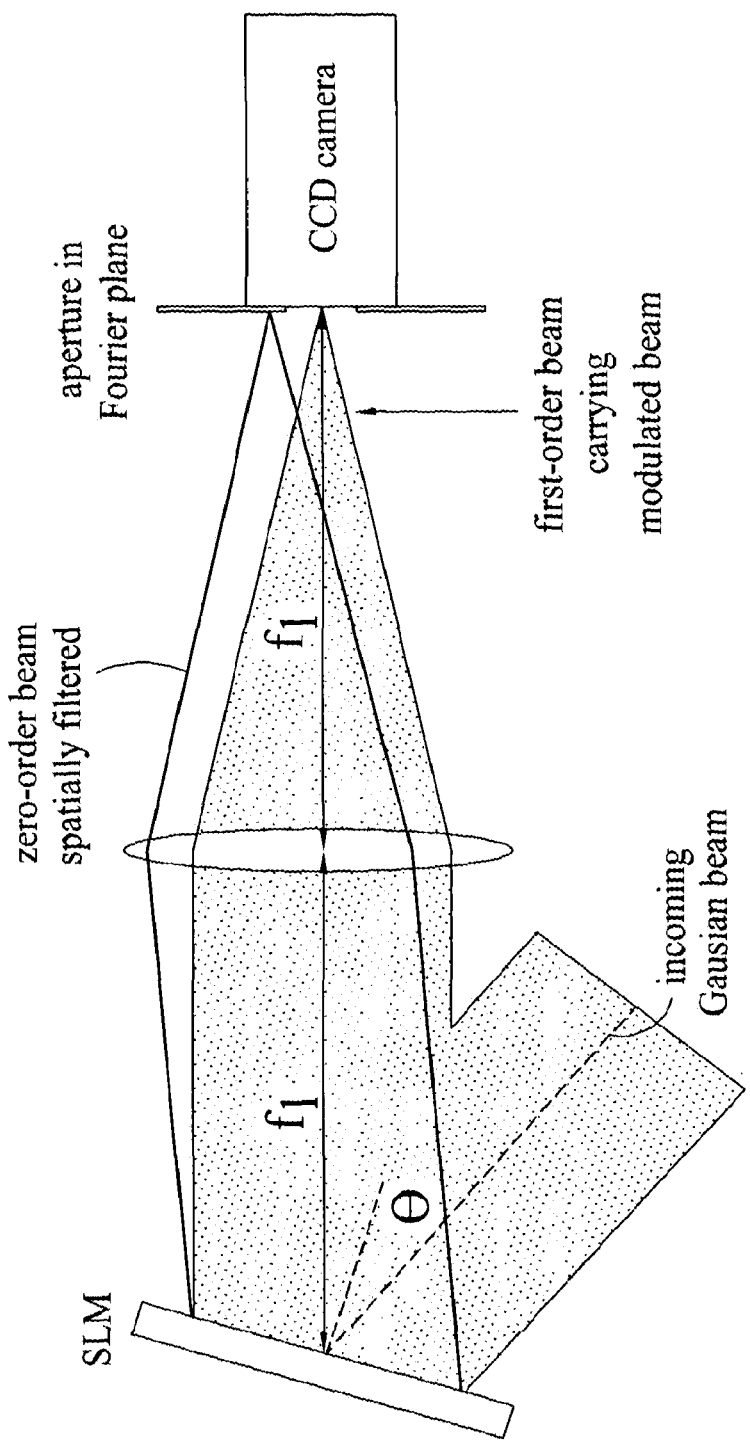
FIG. 1 shows an experimental set up for determining the smallest spot size based on a measure of overlapping test fields.

The method of the invention is based on the linearity of Maxwell's equations and the fact that the interaction between light and its surroundings may be considered quadratic in nature with respect to the electromagnetic fields. Firstly, the linearity of the electromagnetic fields, i.e. the sum of two solutions of Maxwell's equations is itself a solution of them. Secondly, interactions of the electromagnetic field with its environment can be written in the form of quadratic expressions with respect to the electric and magnetic fields. Examples include the energy density, the energy flow and Maxwell's stress tensor. This allows appropriate "quadratic measure" eigenmodes to be designated to various parameters (e.g. spot size) and subsequently used to ascertain the minimum eigenvalue which, in the case of a spot size operator yields a sub-diffraction optical feature.

The method assumes monochromatic solutions of free space Maxwell's equations, with E and H the electric and magnetic vector fields and with $\epsilon_0$ and $\mu_0$ the vacuum permittivity and permeability. These solutions can be written in an integral form linking the electromagnetic fields on the surface A with the fields at any position r:

$$F_u(r) = \int_A P_{uv}(r, r')F_v(r')dS' \quad (1)$$

where $\sqrt{2}\,\mathcal{F} = (\sqrt{\epsilon_0}E, \sqrt{\mu_0}H)$ is a shorthand for the two electromagnetic fields having six $\mathcal{F}_u$ scalar components. The integration kernel $P_{uv}$ corresponds to a propagation operator giving rise to different vector diffraction integrals such as Huygens, Kirchhoff and Stratton-Chu. All linear and measurable properties of the electromagnetic field can be expressed as quadratic forms of the local vector fields and are therefore termed quadratic measures. For instance, the time averaged energy density of the field is proportional to $\mathcal{F}^* \cdot \mathcal{F} = \frac{1}{2}(\epsilon_0 E^* \cdot E + \mu_0 H^* \cdot H)$ while the energy flux is proportional to $\frac{1}{2}(E^* \times H + E \times H^*)$, where * stands for the complex conjugate. Integrating the first quantity over a volume determines the total electromagnetic energy in this volume while integrating the normal energy flux across a surface determines the intensity of the light field incident on this surface. All the quadratic measures can be represented in a compact way by considering the integral $$M_\kappa = \int_V F_u^* \kappa_{uv} F_v dr = \langle F|\kappa|F\rangle_V \quad (2)$$

where the kernel $\kappa_{uv} = \kappa_{vu}^\dagger$ is Hermitian where † the adjoint operator including boundary effects for finite volumes.

| Operator | $2F_u^* \kappa_{uv} F_v$ |
|---|---|
| Energy Operator (EO) | $\epsilon_0 E^* \cdot E + \mu_0 H^* \cdot H$ |
| Intensity Operator (IO) | $(E^* \times H + E \times H^*) \cdot u_k$ |
| Spot size operator (SSO) | $r^2(E^* \times H + E \times H^*) \cdot u_k$ |
| Linear Momentum operator (LMO) | $\epsilon_0 E^* \cdot (i\partial_k)E + \mu_0 H^* \cdot (i\partial_k)H$ |
| Orbital angular momentum (OAMO) | $\epsilon_0 E^* \cdot (ir \times \nabla)_k E + \mu_0 H^* \cdot (ir \times \nabla)_k H$ |
| Circular spin operator (CSO) | $i(E^* \cdot H - H^* \cdot E)$ |

The above table shows some operators associated with common quadratic measures for electromagnetic fields. The integrand part of all these quadratic measures corresponds to the conserving densities which together with the associated currents is Lorentz invariant. The volume, over which the integral is taken, does not need to be the whole space and can be a region of space, a surface, a curve or simply multiple points. This general integration volume will be termed the region of interest (ROI). Using the general definition of the quadratic measures, it is possible to define a Hilbert subspace, over the solutions of Maxwell's equations, with the energy operator (EO) defining the inner product. Further, any general quadratic measure defined by (2) can be represented in this Hilbert space by means of its spectrum of eigenvalues and eigenfunctions defined by $\lambda \mathcal{F}_u = \kappa_{uv} \mathcal{F}_v$.

Depending on the operator $\kappa_{uv}$, the eigenvalues $\lambda$ form a continuous or discrete real valued spectra which can be ordered. This gives direct access to the solution of Maxwell's equations with the largest or smallest measure. The eigenfunctions are orthogonal to each other ensuring simultaneous linearity in both field and measure. Different quadratic measure operators and their spectral decomposition into modes, which will be termed quadratic measures eigenmodes (QME), have been studied. The convention for operator labelling adopted is the shorthand QME followed by a colon and a shorthand of the operator name.

In a practical example, the operators utilised will be the intensity operator QME:IO and the spot size operator QME:SSO defined in the following to engineer the size of a laser focus. The QME:IO measures the electromagnetic energy flow across a surface A:

$$m^{(0)} = \frac{1}{2} \int_{ROI} (E^* \times H + E \times H^*) \cdot n dS \quad (3)$$

where n is normal to the surface of interest. The eigenvector decomposition of this operator can be used, for example, to maximise the optical throughput through a pinhole or to minimise the intensity in dark spots. Considering a closed surface surrounding an absorbing particle, the QME of the IO gives access to the field that either maximises or minimises the absorption of this particle. The definition of the QME:SSO is based on the concept of determining the spot size of a laser beam by measuring, keeping the total intensity constant, the second order momentum of its intensity distribution.

$$m^{(2)} = \frac{1}{2} \int_{ROI} |r - r_0|^2 (E^* \times H + E \times H^*) \cdot n \, dS \quad (4)$$

where r is the position vector and $r_0$ the centre of the beam. The eigenvalues of this operator measure the spread of the beam with respect to its centre and the smallest eigenvalue defines the smallest spot achievable in the ROI.

For an experimental determination of both the QME:IO and QME:SSO, consider a pair of an initial and a target plane located at the propagation distances $z=z_I$ and $z=z_T$ and connected through a linear optical system. A superposition of fields:

$$E(x, y, z_I) = \sum_{u=1}^{N_u} a_u E_u(x, y, z_I)$$

$$(a_u \in C, N_u \in N)$$

in the initial plane is rendered into a superposition of the respective propagated fields:

$$E(x, y, z_T) = \sum_{u=1}^{N_u} a_u E_u(x, y, z_T)$$

characterised by the same set of coefficients $a_u$ due to linearity of the optical system. Based on this superposition approach and the QME:IO as defined in equation (3), the intensity in the target plane can be represented as $m^{(0)} = a^* M^{(0)} a \cdot M^{(0)}$. This is a N×N matrix with the elements given by the overlap integrals $$M_{uv}^{(0)} = \int_{ROI} E_u^*(x, y, z_T) E_v(x, y, z_T) \, dS. \quad (5)$$

This matrix is equivalent to the QME:IO on the Hilbert subspace defined by the fields $E_u(x,y,z_T)$. $M^{(0)}$ is Hermitian and positive-definite which implies that its eigenvalues $\lambda_k^{(0)}$ ($k=1 \ldots N_u$) are real and positive and the eigenvectors $v_k^{(0)}$ are mutually orthogonal. Accordingly the largest eigenvalue $\lambda_{max}^{(0)} = \max(\lambda_k^{(0)})$ and the associated eigenvector $v_{max}^{(0)}$ deliver the superposition:

$$E_{max}(x, y, z) = \sum_{u=1}^{N_u} v_{max,u}^{(0)} E_u(x, y, z)$$

($z = z_I$ and $z = z_T$ due to linearity)

which maximizes the intensity within the ROI. Similar to the QME:IO, the QME:SSO as defined in equation (4) can be written as $m^{(2)} = b^* M^{(2)} b$ where $M^{(2)}$ must be represented in the intensity normalised base:

$$E_k(x, y, z_T) = \sum_{u=1}^{N_u} (v_{k,u}^{(0)} / \lambda_k^{(0)}) E_u(x, y, z_T)$$

and $M^{(2)}$ is a N×N matrix with the elements given by:

$$M_{uv}^{(2)} = \int_A |r - r_0|^2 E_u^*(x, y, z_T) E_v(x, y, z_T) \, dS. \quad (6)$$

The eigenvalues of $M^{(2)}$ are denoted as $\lambda_k^{(2)}$ and the eigenvectors as $v_k^{(2)}$. The eigenvector associated with the smallest eigenvalue corresponds to the smallest spot achievable within the ROI through the linear superposition of the $N_u$ fields $E_u(x,y,z_I)$ considered initially.

Experiments were conducted are based on the expressions (5) and (6). This allowed the superposition coefficients to be determined for the smallest spot from a set of test electric fields $E_u(x,y,z_T)$ measured in the target plane. An expanded HeNe laser beam was used (P=4 mW, λ=633 nm) to illuminate the chip of a phase-only spatial light modulator (SLM, type Hamamatsu LCOS X10468-06, 800 pixel×600 pixel) operating in the standard first order configuration. FIG. 1 shows the set-up used. This has a laser source for generating an incoming Guassian beam. This is incident on the spatial light modulator and reflected towards a focussing lens, which focuses the first order modulated beam onto a CCD camera/detector that is located at the focal plane of the lens. Surrounding the input of the camera is an aperture, which prevents the zero order beam being detected.

Zernike polynomials $Z_n^m(x,y)$ (m,n∈N) were chosen to modulate the beam phase for test fields. These exhibited a phase behavior according to:

$$E_u(x,y,z_I) \propto \exp(i \cdot Z_n^m(x,y))$$

where u enumerates the different combinations (n,m).

In use, the modulated beam was propagated through the spherical lens (focal width f=1 m), the linear optical system, and then detected with the CCD camera (Basler pilot piA640-210gm). Since the CCD camera only detected intensities a lock-in technique to the optical domain was used. A reference Gaussian beam, whose phase was oscillated in time using the SLM, was interfered with the test field in the target plane in order to determine both amplitude $A_u(x,y,z_T)$ and phase $\Phi_u(x,y,z_T)$ of the test field in the target plane. The respective reference field parameters $A_R(x,y,z_T)$ and $\Phi_R(x,y,z_T)$ were independently determined using self-interference and an approximate evaluation of the phase gradient field including subsequent numerical integration.

The experimental QME approach requires determination of the transversal amplitude and phase of the laser beams in the detector plane. The amplitude needs only be known up to a constant factor and the phase up to a constant offset. Therefore, the "∝" sign is used for brevity in the following.

In the following, the electric field of the test beam, from which the QME operators are constructed, is denoted as $E=Ae^{i\Phi}$, where A and $\Phi$ denote the amplitude and phase of the field, and the electric field of a reference beam is denoted as $E_R=A_R e^{i\Phi_P}$. The test beam and the reference beam were simultaneously created using SLM random encoding. In addition, the SLM is used to add a spatially constant phase $\Phi_t=\psi t$ ($\psi$=const) to the beam of interest which was increasing in time. As a consequence the CCD camera detected the total intensity $$I(t) \propto |Ae^{i(\Phi+\psi t)} + A_R e^{i\Phi_R}|^2 \qquad (7)$$

at a time t, $\psi$ is chosen in a manner that an integer multiple of $2\pi$ was collected over the course of the experiment, i.e., $$\psi = \frac{2\pi}{T}$$

where T is the measurement time. Crucially the temporal fourier transform F[I] of the detected set of intensities will extract the single term $$F[I] = \int_0^T I(t')e^{-i\psi t'} \propto AA_R e^{i(\Phi-\Phi_R)} = EE^*_R \qquad (8)$$

since all other since all the other terms exhibit oscillatory behaviour in time and therefore vansih when integrated over multiples of full periods. The asterisk refers to the complex conjugate. Clearly this approach is the lock-in amplifier technique applied to the optical domain.

The characterisation of the reference field $E_R$ is achieved as follows: to begin with the reference amplitude $A_R$ is straightforwardly determined by recording an intensity image of the reference beam and subsequently taking the square root, i.e., $$A_R \propto \sqrt{I_R}. \qquad (9)$$

The measurement of the phase profile $\Phi_R$ requires more effort and goes via the gradient $\Delta\Phi_R = \partial_\xi \Phi_R, \partial_\psi \Phi_R$. The basic idea applies the numerical standard five point stencil approximation of the first derivate of a function f(x). This Taylor-expansion based approximation is defined on a discrete five point lattice of spacing h and explicitly reads $$\frac{df}{dx} \approx \frac{f(x-2h) - 8f(x-h) + 8f(x+h) - f(x+2h)}{12h}. \qquad (10)$$

This can be realized by splitting the reference beam into two beams using SLM random encoding where a linear phase modulation was added to one beam which deflected this beam in the detector plane by a distance h in both the $\tilde{x}$ and the $\tilde{y}$ direction. The total intensity was then measured with the CCD camera according to 7 and obtained the respective fourier transform according to 8 as $$F[I_{\alpha,\beta}] = E_R(x+\alpha h, y+\beta h)E^*_R(x,y) \qquad (11)$$

where $\alpha,\beta = \tilde{2},1,0,1,2$. Overall the gradient of the reference phase was explicitly obtained as $$\begin{pmatrix} \partial_x \phi_r \\ \partial_y \phi_R \end{pmatrix} = \Im \begin{pmatrix} \frac{F[I_{-2,0}] - 8F[I_{-1,0}] + 8F[I_{1,0}] - F[I_{2,0}]}{12hF[I_{0,0}]} \\ \frac{F[I_{0,-2}] - 8F[I_{0,-1}] + 8F[I_{0,1}] - F[I_{0,2}]}{12hF[I_{0,0}]} \end{pmatrix} \qquad (12)$$

where $\Im$ extracts the imaginary part of the complex vector. Finally the data were fitted to the gradient of a polynomial of order n (typically n=6) which yielded the phase profile $\Phi_R(x,y)$ in the detector plane.

The standard first-order SLM configuration intrinsically focuses an unmodulated beam into the detector plane but the focus can be relocated along the optical axis by adding a quadratic phase to the beam and so the beam size can arbitrarily be increased in the detector plane. Such an expanded Gaussian beam served as a reference beam whose amplitude $A_R$ and phase $\Phi_R$ were determined according to equation 9 and equation 12 (the latter including polynomial fitting). The required temporal phase scans for the nine required intensities $I_{\alpha\beta}$ were realized at $N_t$ discrete time steps $t_j$ (typically $N_t$=48) accumulating a total phase shift of $\Phi_t=8\pi$ followed by a discrete fourier transform to obtain the nine required to evaluate $\Delta\Phi_R$. Given the explicit knowledge of $A_R$ and $\Phi_R$ the amplitudes $A_u$ and $\Phi_u$ (u=1, . . . , N) of the N test beams were then determined according to equation 8, each beam requiring a 48 point temporal phase scan. On a final note the test beam phase could be determined via equation 12 as well. However, the approach based on equation 8 is non-approximate apart from evaluation at discrete time steps and only requires a single temporal phase scan.

Both the QME:IO and the QME:SSO were finally constructed from the measured parameters $A_u(x,y,z_T)$ and $\Phi_u(x,y,z_T)$ according to equations (5) and (6). Dedicated Labview and Matlab software allowed recordal a set of $N_u$ test fields $E_u(x,y,z_T)$ (typically $N_u$=231 corresponding to the Zernike polynomials up to order n=20) at a rate of 50 Hertz. Each test field required a 48 point temporal phase scan. Numerical evaluation of the QME:IO and QME:SSO delivered the required superposition:

$$E(x, y, z_l) = A(x, y, z_l)e^{i\phi(x,y,z_l)} = \sum_{i=1}^{N_u} v^{(2)}_{min,u} E_u(x, y, z_l)$$

which was encoded onto the SLM. The final superposition required simultaneous modulation of both amplitude and phase of the laser beam incident onto the SLM which was encoded to a phase-only SLM using the approximation $Ae^{i\Phi} \approx e^{iA\Phi}$. The QME:SSO was determined for decreasing size of the target ROI, which allowed the laser spot size to be reduced below the diffraction limit.

Figure 2:
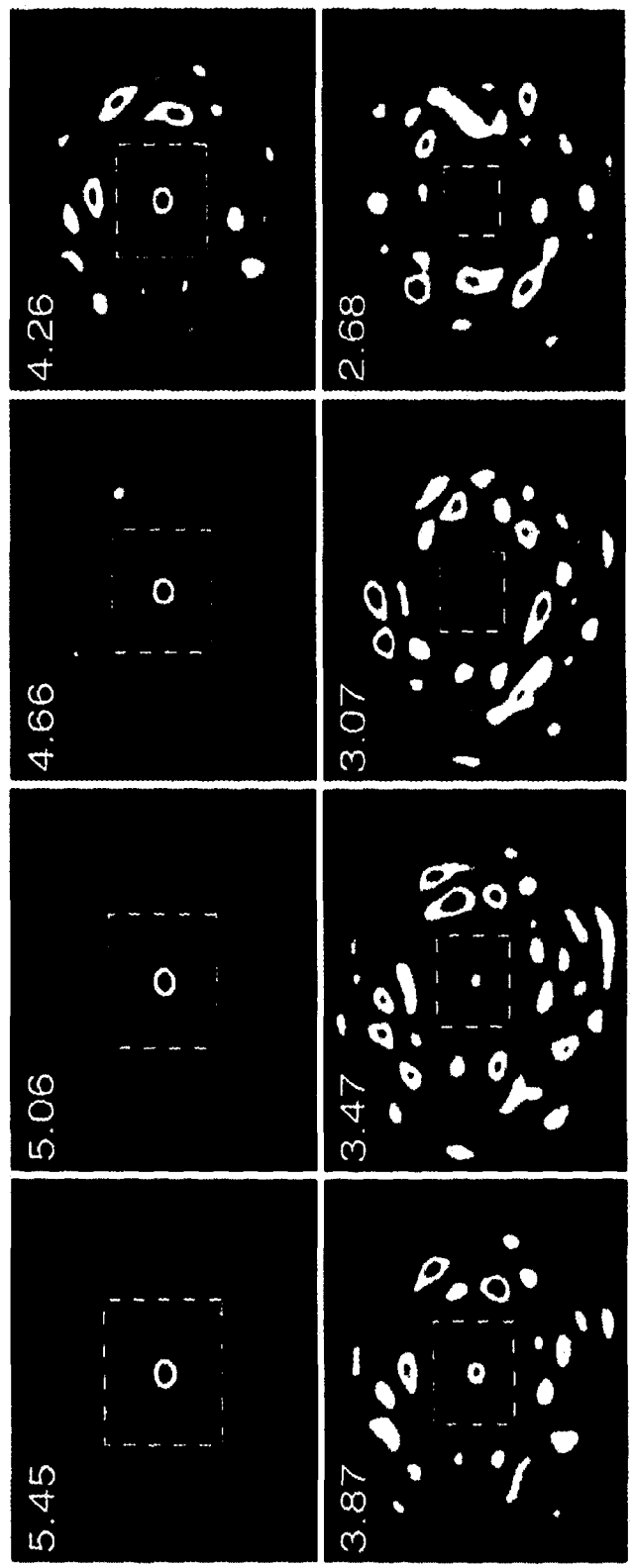
FIG. 2 shows a set of intensity profiles obtained after encoding a superposition of test fields for different target region of interest sizes.

FIG. 2 shows a set of intensity profiles $I(X,Y,Z_T)$ obtained after encoding the final superposition of test fields for different target ROI sizes (the ROI is indicated by the dashed line). The ROI side length $a_{ROI}$ is indicated in the profile's left top corner in units of the Airy disk size $\sigma_{Airy-disk}$ which was $\sigma_{POI}$=63 μm given the laser wavelength $\lambda$ and the numerical aperture NA=0.05 of our optical setup. The intensity profiles reveal a central spot whose size is decreasing when the ROI size is reduced. This is balanced by a redistribution of intensity into the area outside of the ROI. The applied procedure not only aims to achieve the smallest spot size possible for a given set of test fields, but also clearly aims to keep the redistributed intensity entirely outside the rectangularly shaped ROI. The redistributed intensity starts to evolve at $\sigma/\sigma_{Airy-disk} \approx 6$ (data not shown) and becomes predominant for $\sigma/\sigma_{Airy-disk}<4$.

Figure 3:
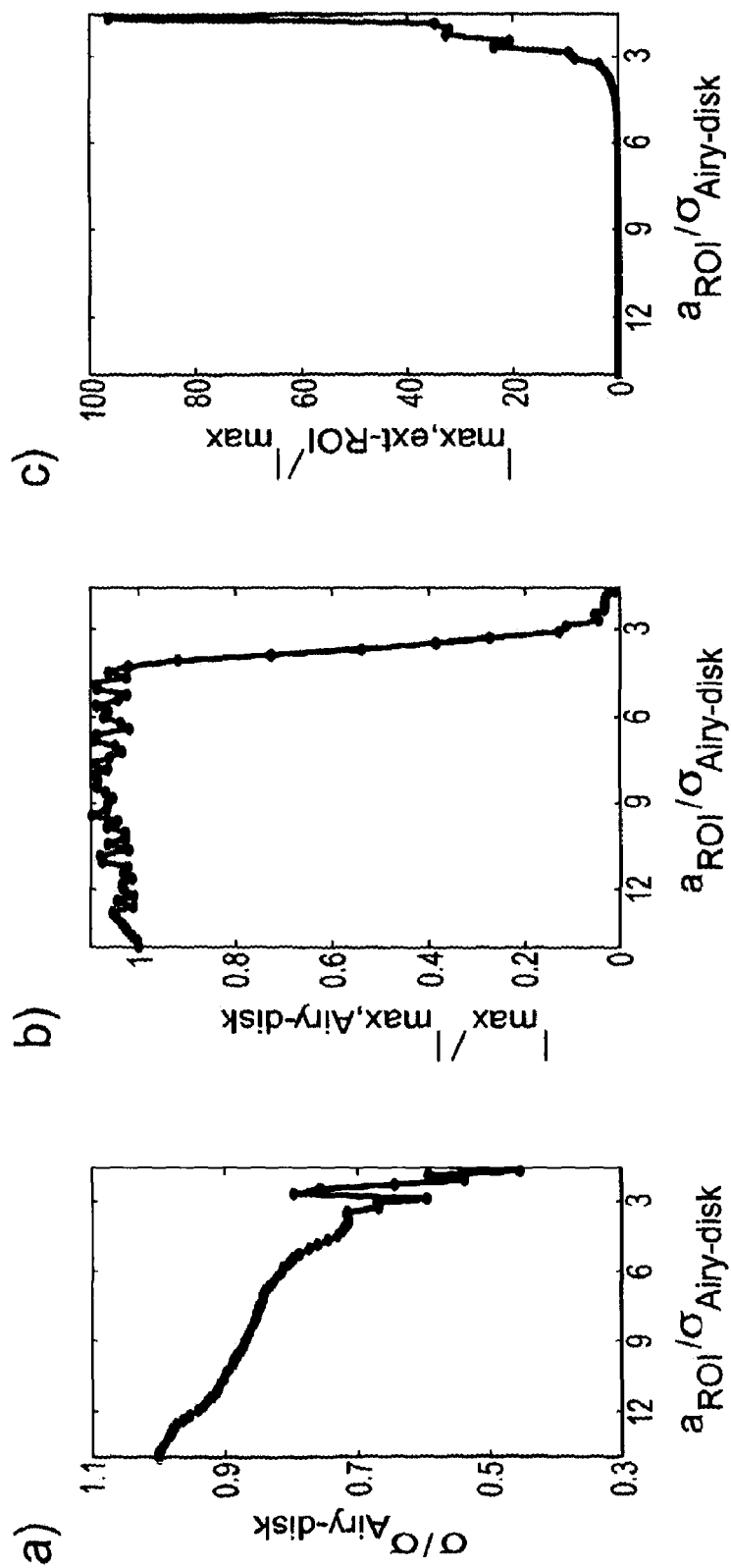
FIG. 3(a) shows central spot size σ (determined as the Full Width Half Maximum (FWHM) of a Gaussian the central spot is fitted to) in units of 94 $_{Airy\text{-}disk}$ versus $a_{ROI}/\sigma_{Airy\text{-}disk}$.
FIG. 3(b) shows peak intensity $I_{max}$ of central spot relative to the peak intensity $I_{max,Airy\text{-}disk}$ of the Airy disk versus $a_{ROI}/\sigma_{Airy\text{-}disk}$.
FIG. 3(c) shows peak intensity $I_{ext\text{-}ROI}$ outside of the ROI relative to the central spot peak intensity $I_{max}$ versus $a_{ROI}/\sigma_{Airy\text{-}disk}$.

A quantitative analysis of the qualitative profiles shown in FIG. 2 has been done based on the following parameters: (1) the central spot size a (determined as the FWHM of a Gaussian the central spot is fitted to) in units of $\sigma_{Airy\text{-}disk}$; (2) the peak intensity $I_{max}$ of the central spot relative to the peak intensity $I_{max,Airy\text{-}disk}$ of the Airy disk and (3) the peak intensity $I_{ext\text{-}ROI}$ outside of the ROI relative to the central spot peak intensity $I_{max}$. The respective parameters were plotted versus $a_{ROI}/\sigma_{Airy\text{-}disk}$ as shown in FIG. 2(a)-(c). The plotting range extends to $a_{ROI}/\sigma_{Airy\text{-}disk} \approx 2$ where the measured data became very noisy since the limits in terms of both SLM encoding and detector sensitivity were reached. All three parameters exhibit distinct changes when $\sigma/\sigma_{Airy\text{-}disk} \approx 5$. The relative spot size $\sigma/\sigma_{Airy\text{-}disk}$ quickly drops to a value below 0.5 after having persistently decreased to approximately 0.7, see FIG. 3(a). The central spot relative peak intensity $I_{max}/I_{max,Airy\text{-}disk}$ manifests a sharp decrease of the relative eigenspot peak intensity, as can be seen from FIG. 3(b). The redistributed relative intensity $I_{max,ext\text{-}ROI}/I_{max}$ simultaneously experiences a vast increase, as shown in FIG. 3(c).

Overall, the central spot size is decreased below the diffraction limit at the expense of the spot intensity which is redistributed to the so-called side bands around the spot. The quadratic measure eigenmodes approach is a generic method that does not rely on Fourier relationship but can be used to optimise any general quadratic measure operator. The application of QME corresponds to minimising the spot size of a superposition of bandwidth limited fields.

Figure 4:
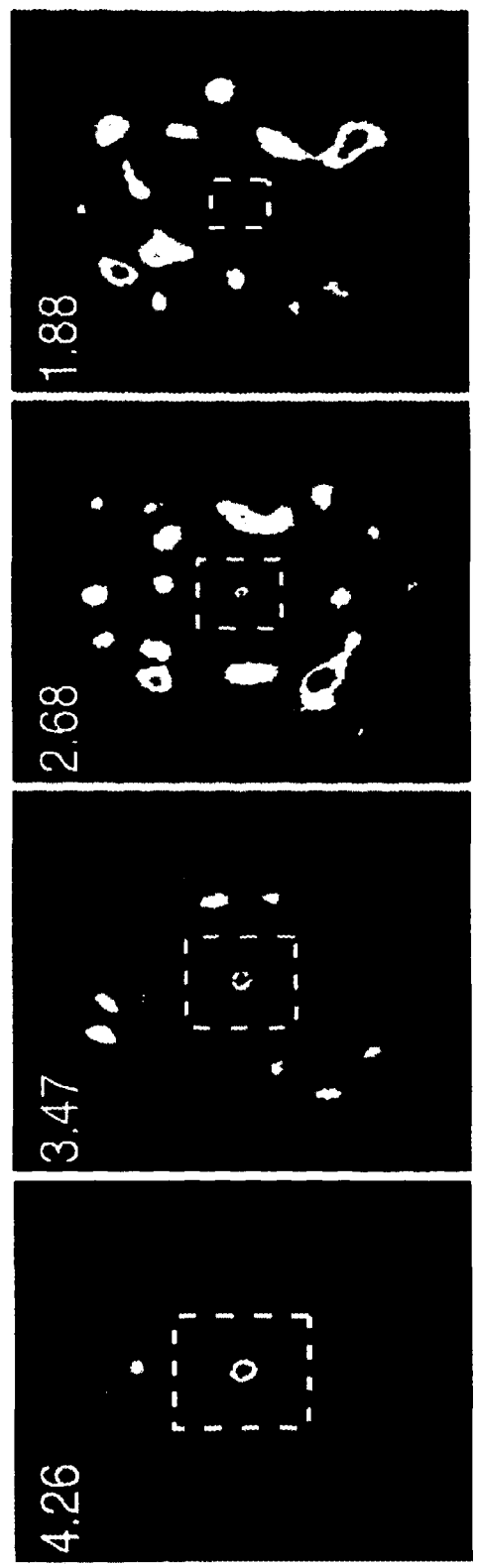
FIG. 4 shows intensity distributions for the results of numerical superpositions of measured fields $E_u(x,y,z_T)$ in the image plane, with FIGS. 3(a) to (d) showing increasingly smaller spot sizes in the region of interest.
Figure 5:
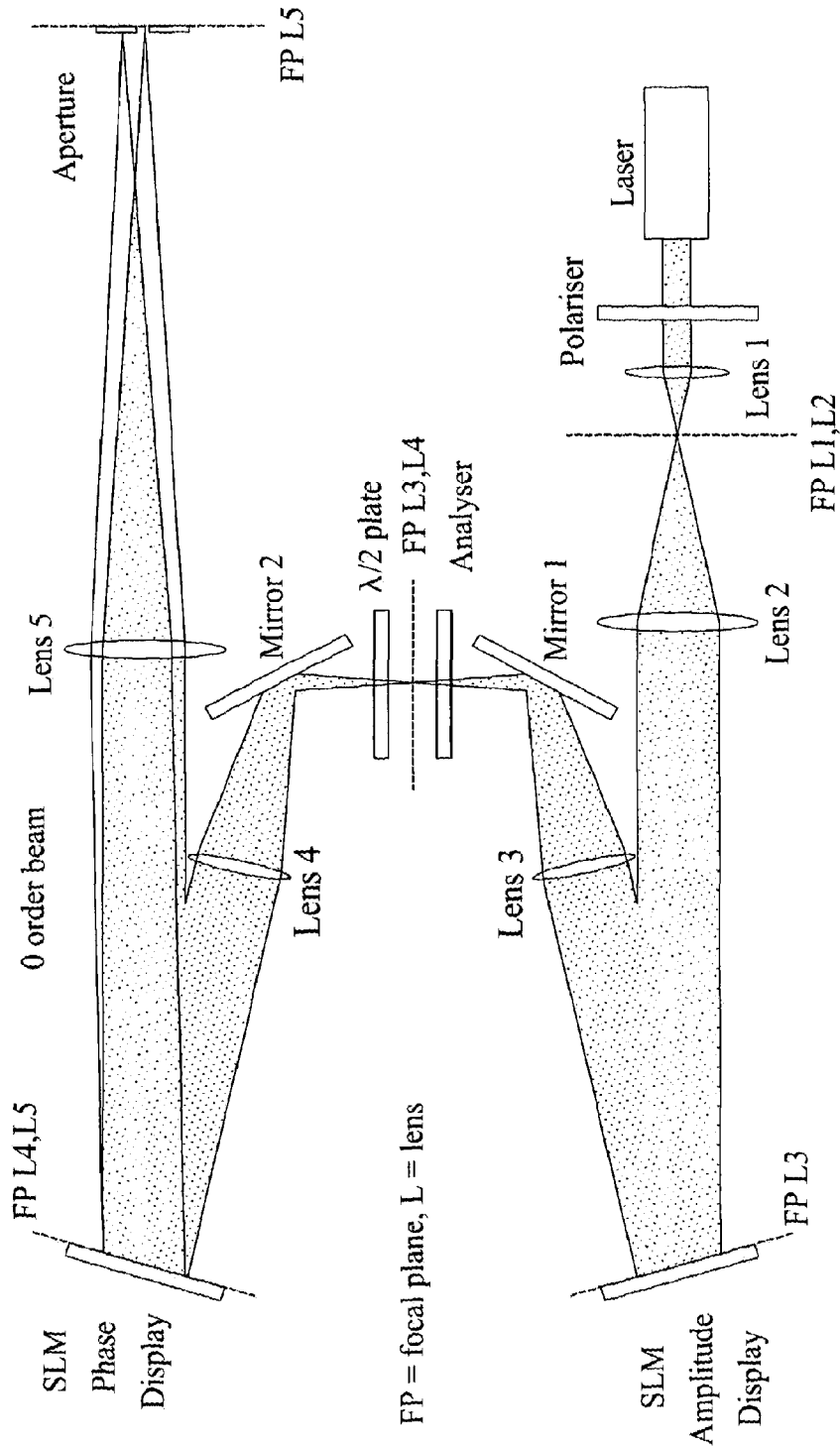
FIG. 5 illustrates an optical arrangement for the direct modulation of both phase and amplitude.

Due to phase-only SLM encoding, limited SLM resolution, and limited detector resolution and sensitivity used for the experiments, the minimum spot size is limited to $\sigma_{Airy\text{-}disk} \approx 0.5$. However, lower spot sizes could be achieved. To demonstrate this, a numerical superposition of the measured fields $E_u(x,y,z_T)$ in the image plane has been perfomed. The resulting intensity distribution is shown in FIG. 4. This could be achieved with an advanced experimental configuration, in particular featuring high resolution amplitude and phase SLM encoding (the central spot in the right graph has a size of $\sigma_{Airy\text{-}disk} \approx 0.1$). FIG. 5 shows a possible implementation of the dual display SLM allowing for direct modulation of the phase and amplitude. An advantage of the simultaneous independent modulation of the incident field is that it allows the direct generation of the QME modes.

The generic nature of the invention means that it may be applied to optimise the size and contrast of optical dark vortices, the Raman scattering or fluorescence of any samples, the optical dipole force and the angular/linear momentum transfer in optical manipulation. The approach is applicable to all linear physical phenomena where generalised fields interfere to give rise to quadratic measures.

The intensity and spot size are represented as a quadratic measure with associated eigenmodes. Using a dynamic diffractive optical element, optical focussing to an area four times smaller than the diffraction limit can be achieved. The generic method may be applied to numerous physical phenomena relating to linear and measurable properties of the electromagnetic field that can be expressed in a quadratic form. It is not restricted to the optical range and can be applied to the whole wavelength range of the electromagnetic spectrum including radio waves and X-rays.

The invention can directly be applied to optimise and engineer the properties of mechanical waves such as sound waves and ultrasound, provided the properties can be expressed in a quadratic form. In this case, the adaptive optical element is replaced by, for example, an array of transducers allowing the generation of a superposition of different eigenmodes of the ultrasound wave. In this context, the QME method can be applied, for example, to the creation of sub-diffraction ultrasound focal regions useful in medical imaging and treatment.

Using the QME method, it is possible to design optical fields that enhance various measureable quantities. In general, there are two different techniques to create or determine the QME fields that optimise a given measure: the experimental approach or the theoretical approach.

The experimental method is based on experimentally probing the "response" of an optical system under the incidence of a sequence of interfering probe fields, as described above. The measurable quantity is detected for each pair of interfering fields, and from this set of measures the quadratic operator of the system can be experimentally determined. The eigenvector of this operator corresponds to the QME of the system with respect to the specific measure. It can be used to optimise this specific measure. This method is suitable for optical systems that are not known and include not corrected abberations.

The theoretical approach to determining the QME for a given measure considers a perfect aberration corrected optical system whose response can be described within any set of optical propagation equations such as the paraxial equations, scalar Helmhotz and fully vector Maxwell's equations. Within these different representations, general electromagnetic fields can be described as a superposition of Hermite-Gausian beams, Laguerre-Gaussian beams, plane waves etc. These representations can be used to define the quadratic measure operator and the resulting eigenmodes optimising the considered measure. This second method is applicable when the optical system is aberration corrected and its optical transfer functions are known.

Figure 6:
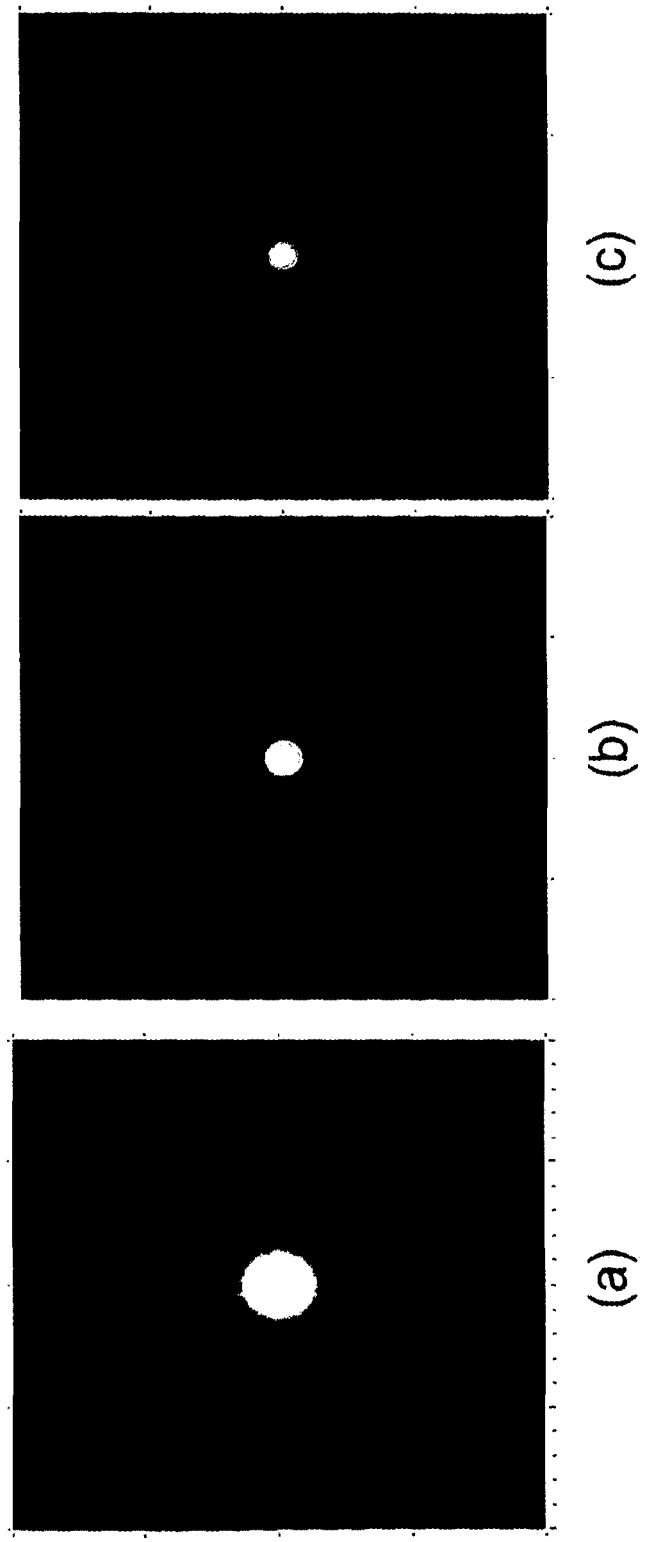
FIG. 6 shows the cross-section of the first three Laguerre-Gaussian modes with P=0, 1, 2 and L=0.

To exemplify the theoretical approach consider the superposition of Laguere-Gaussian beams to achieve a sub-diffraction focal spot that can be used for nano-surgery and sub-diffractive spectroscopical excitation for imaging purposes for example. FIG. 6 shows the cross-section of the first three Laguerre-Gaussian modes with (P=0,1,2 and L=0). These beams are orthogonal to each other with respect to the intensity that they transport. This means that considering the general field as decomposed onto the basis set, the intensity operator does not have to be used to orthogonalise and normalise the basis set.

When using an infinite transversal region of interest, the spot size of any interference pattern originating from any pair of beams taken from the Laguerre-Gaussian set can be analytically determined. Using the first eleven Laguerre-Gaussian modes the QME delivers the following amplitudes for the superposition of these modes:

TABLE 1

Amplitude coefficients of the Laguerre-Gaussian beam superposition defining the smallest central spot using the first eleven LG modes all with L = 0.

| Mode number, P, (L = 0) | Amplitude |
| --- | --- |
| 0 | 0.533791 |
| 1 | −0.466642 |
| 2 | 0.403717 |
| 3 | −0.344838 |
| 4 | 0.289834 |
| 5 | −0.238538 |
| 6 | 0.190791 |
| 7 | −0.146436 |
| 8 | 0.105323 |

TABLE 1-continued

Amplitude coefficients of the Laguerre-Gaussian beam superposition defining the smallest central spot using the first eleven LG modes all with L = 0.

| Mode number, P, (L = 0) | Amplitude |
|---|---|
| 9 | −0.0673056 |
| 10 | 0.0322434 |

Figure 7A:
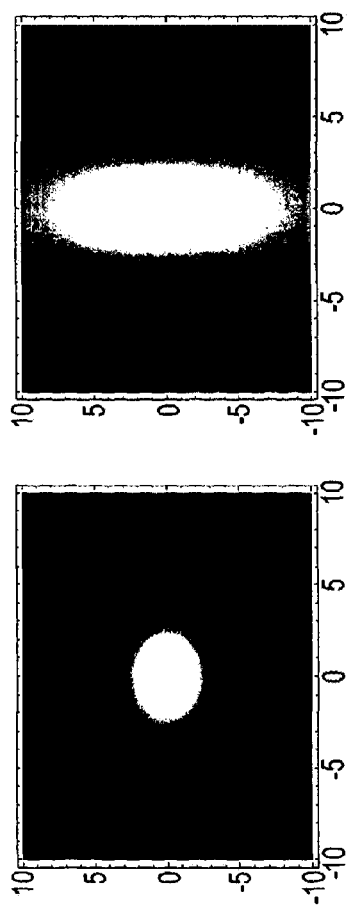
FIG. 7 shows a comparison of the (left) transversal cross sections of (a) Gaussian beam and (b) QME spot size superposition mode.
Figure 7B:
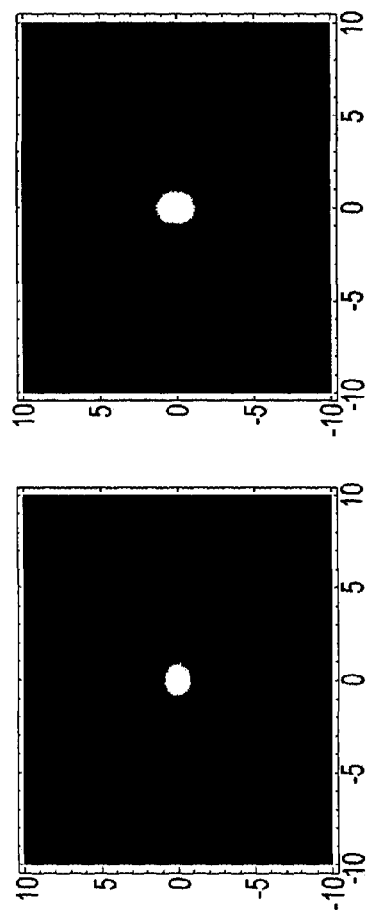

The QME beam defined by the superposition (see Table 1) is only ⅓ in beam radius compared to the Gaussian beam defined by the P=0 and L=0 mode. This 66% reduction in beam size is accompanied by a reduction of propagation depth. This is illustrated in FIG. 7, which shows a comparison of the (left) transversal cross sections of (a) Gaussian beam and (b) QME spot size superposition mode. These cross sections show the reduction of spot size by ⅔. FIG. 7 also shows (right) longitudinal cross section showing accompanied reduction in propagation depth.

The propagation depth is itself a quadratic measurable quantity that can be optimised using this procedure. It is thus possible to increase the propagation distance of the focal spot on the expenses of transversal beam size. Further, the longitudinal and transversal spot size operators are inter-linked (not commuting operators) and as such it is not possible to optimise/minimise both independently of each other.

Using a larger number of Laguerre-Gaussian modes, it is possible to further decrease the size of the focal spot up to the breakdown of the paraxial approximation within which the Laguerre-Gaussian modes are described. To further decrease the spot size beyond this point, it is necessary describe the electromagnetic field within another framework such as Helmhotz or Maxwell's equations. A convenient representation that allows the determination of the QME modes within the vector solutions of Maxwell's equations is the angular spectral decomposition or the Bessel beams. Regardless of the base used, the procedure outlined here is general and can be employed to determine the theoretical eigenmode optimising any quadratic measure considered.

The present invention can be used for numerous different applications, for example optical nano-surgery. This relates to the used of focused laser beams to cut, porate holes and manipulate cells and their organelles. An example of nano-surgery is photoporation aiming, for example, to the transfection of cells through the inclusion of the foreign DNA or other compounds. In this context, the laser beam is focussed onto the cell membrane, which is then subjected to a train of pulsed light that renders the cell membrane permeable to the solution surrounding the cell. The efficiency of this process is highly dependent on the beam profile used to photoporate.

Figure 8:
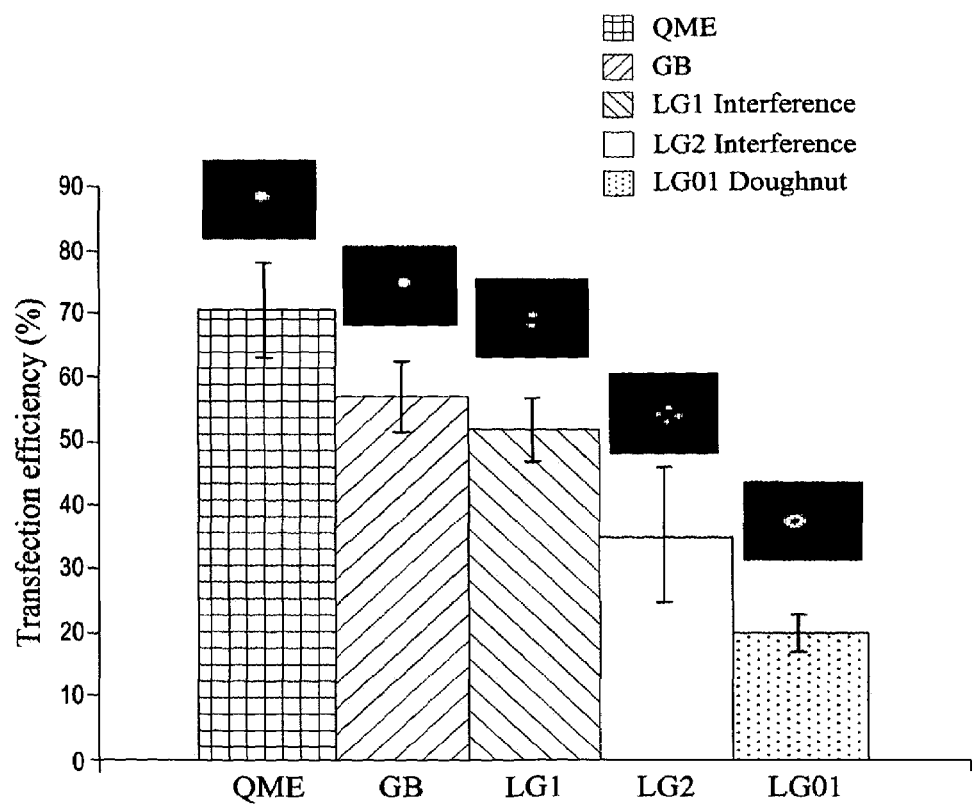
FIG. 8 is a plot of transfection efficiency for a standard Gaussian beam in comparison to simple superposition of Laguerre-Gaussian beams.

FIG. 8 shows efficiency for a standard Gaussian beam in comparison to simple superposition of Laguerre-Gaussian beams. In particular, FIG. 8 shows a measured transfection efficiency (maximised for incident power and shutter time) for different beam shapes. The LG1 bar relates to the interference between two LG beams (P=0,L=1) and (P=0, L=−1) while LG2 relates to the interference between two LG beams (P=0,L=2) and (P=0,L=−2). The GB and LG01 beams correspond to reference beams corresponding respectively to the Gaussian beam and the single LG beam (P=0,L=1). The QME beam relates to the beam described by Table 1 and represented in FIG. 7(b).

FIG. 8 shows efficiency improves for the QME as defined by Table 1 with respect to all the other beams considered. QME may also be applied to other forms of poration including the use of CW and nanosecond pulsed light where the breakdown mechanism and method of poration differs slightly from that stated above. In a wider context, QME may also be applied to laser axotomoy where precision focusing of laser light, typically femtosecond, can be used to selectively sever axons.

Figure 9:
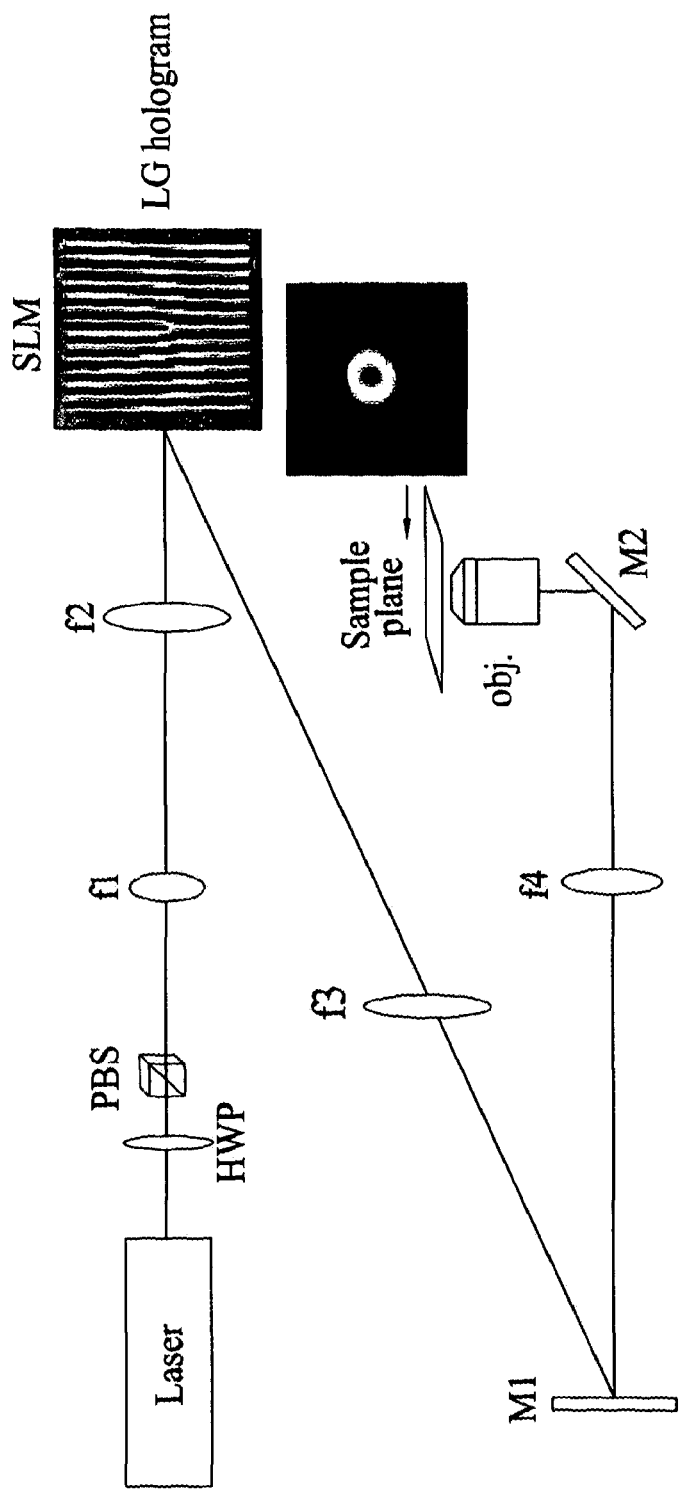
FIG. 9 is a schematic view of an optical arrangement for creating a QME beam for photoporation.

FIG. 9 shows a setup used to create the QME beam for photoporation. This has a wavefront corrected spatial light modulator (SLM) that is used to encode onto the incident field the amplitude and phase delivering the QME constructed from the superposition of the eleven LG modes. Here, the mask displayed on the SLM generates a single Laguerre-Gaussian beam (P=0,L=1) encoded on a phase only SLM by the method described above. The bean is directed onto the sample that is to be porated using an objective lens.

Figure 10:
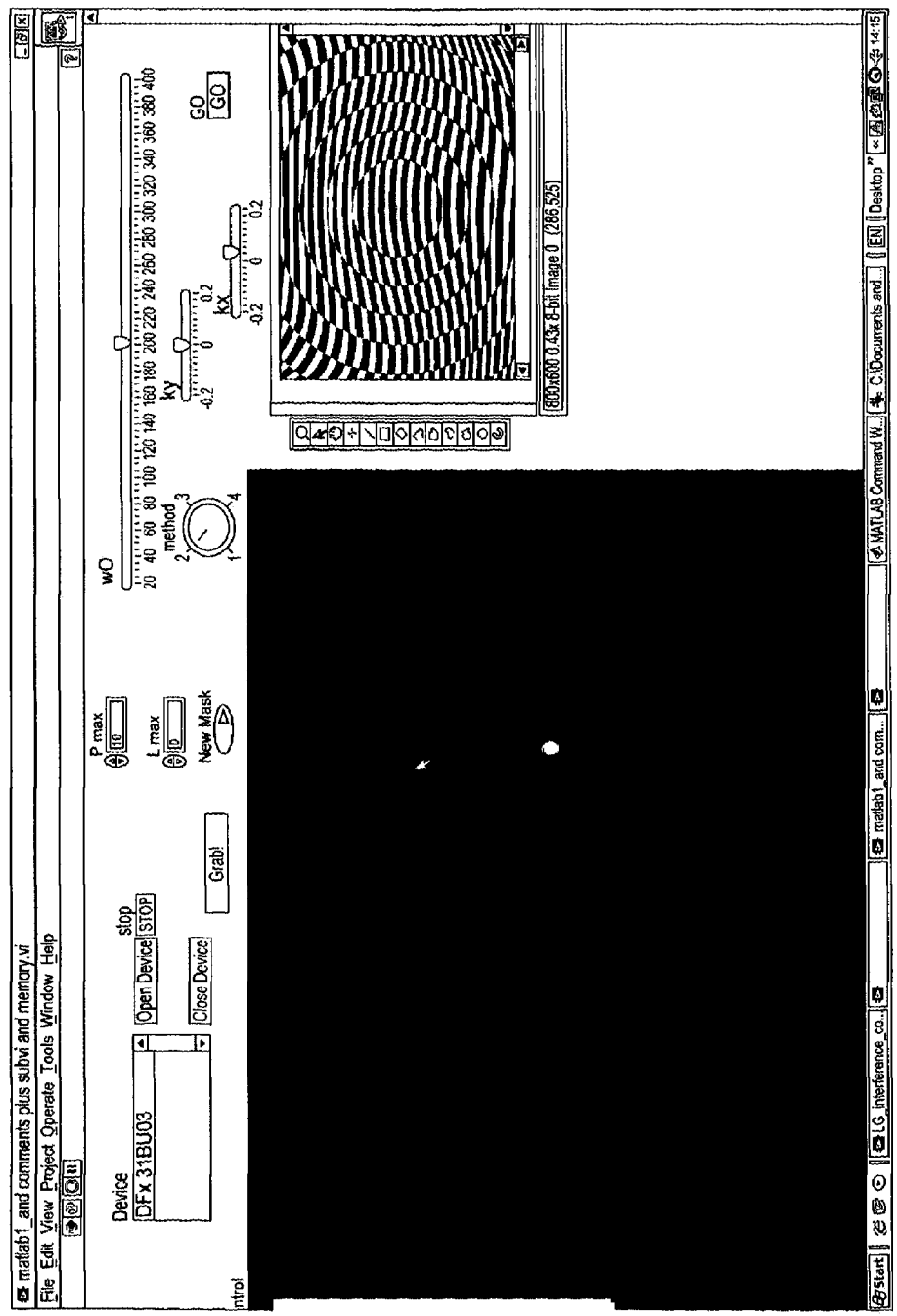
FIG. 10 is a screen shot of an interface to a Labview program for generating and displaying masks for a spatial light modulator for generating a QME in a sample plane.

FIG. 10 shows an interface to a Labview program for generating and displaying masks for the spatial light modulator, which correspond to the QME beam in the sample plane. On the left of the pane is the direct view of the sample plane showing a cell and the QME beam. On the right can be seen the QME phase mask generating this beam.

Two different implementations of the QME method can be used depending on the precise photoporation application. One corresponds to a region of interest given by the whole sample plane as described in the general part of this application. The second method allows for the restriction of the region of interest to a user-defined domain. This domain can be, but does not necessarily have to be, simply connex i.e. single region without holes.

Figure 11A:
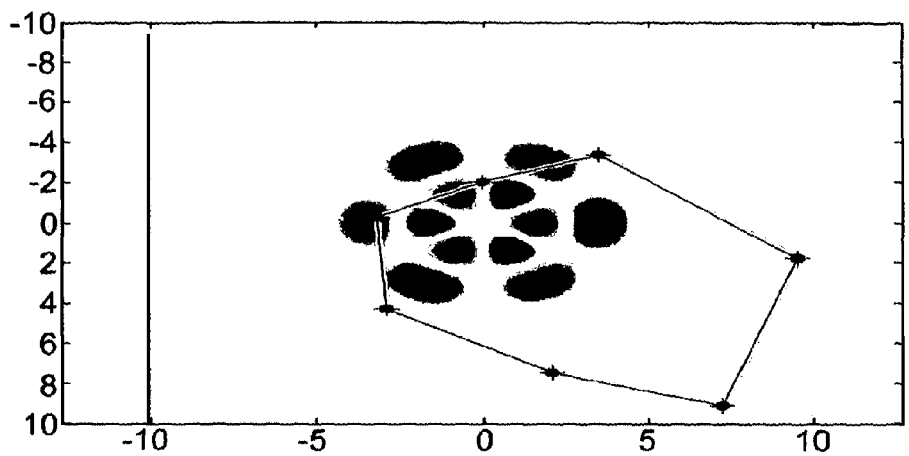
FIG. 11 shows a practical implementation of the user-defined region of interest.
Figure 11B:
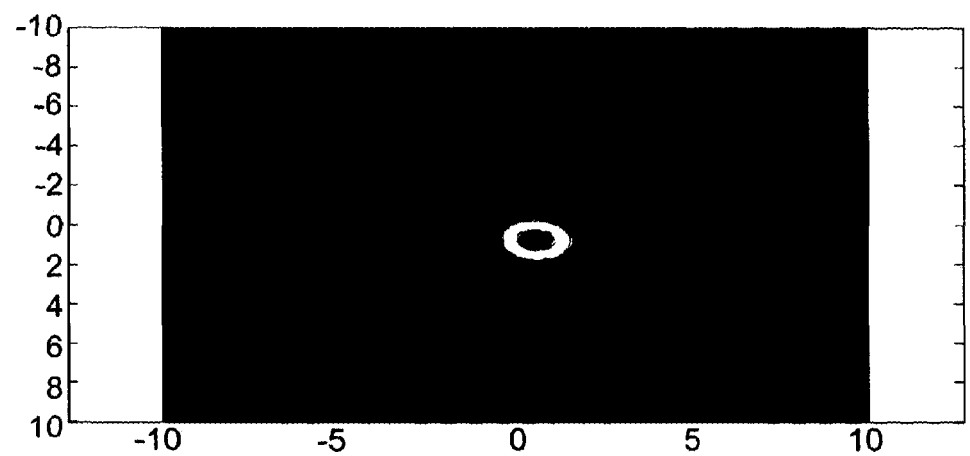

FIG. 11 shows a practical implementation of the user-defined region of interest. FIG. 11(a) shows a user defined region of interest making sure that the sidebands of the QME beam do not enter the region of interest. The background shows the field profile of one the LG base beams (P=1,L=3). FIG. 11(b) shows the smallest spot QME beam taking into account the chosen region of interest. The usefulness of allowing a user to define a region of interest becomes apparent when considering the photoporation of cells. Indeed, the creation of increasingly tighter focussed highly sub-diffraction and sub-wavelength laser spots is accompanied by beam sidebands on the outside of the region of interest. Choosing the region of interest to correspond to the contour of the cell makes sure that these sidebands do not illuminate the cell while ensuring the highest focussing efficiency (efficiency decreases as a function of the region of interest).

Using QME generated sub-diffraction focal spots, optical nano-surgery may be used for the manipulation and ablation of sub-cellular organelles such as vesicles. In this case, QME beam could be used to photoporate or ablate individual vesicles and influence the chemistry of the cell at a sub-cellular level. Equally, the QME method could be used to create sub-diffraction focal spots for micro machining, micro-fabrication, laser writing and optical data storage, allowing the possibility for creating structure/devices with high resolution. In both applications, local masks or special optics (such as a inverted coronograph) can be used to eliminate the sidebands of the QME beams.

QME method can also be used in spectroscopy and more specifically micro-spectroscopy, for example fluorescence spectroscopy or imaging, Raman spectroscopy or imaging and multi photon fluorescence imaging. In all these cases, the quadratic measures eigenmodes can be used to maximise the acquired signal or maximise the signal to noise of the spectra in two ways. The first is on the excitation beam path and the second is on the signal collection or aquisition path. Both methods can reduce the acquisition time.

Figure 12:
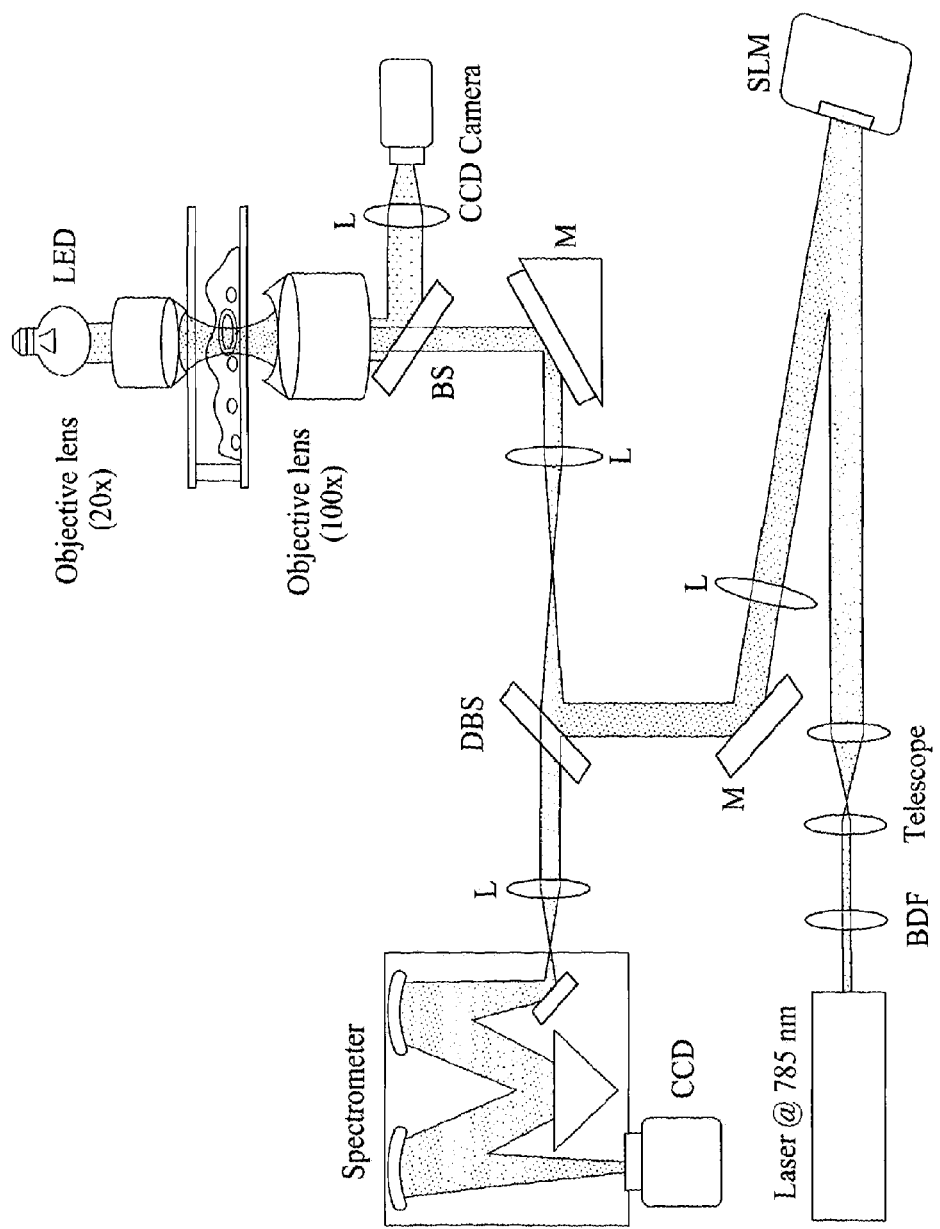
FIG. 12 illustrates a typical Raman set-up including a spatial light modulator encoded to create a QME beam in the excitation part of the set-up.
Figure 13:
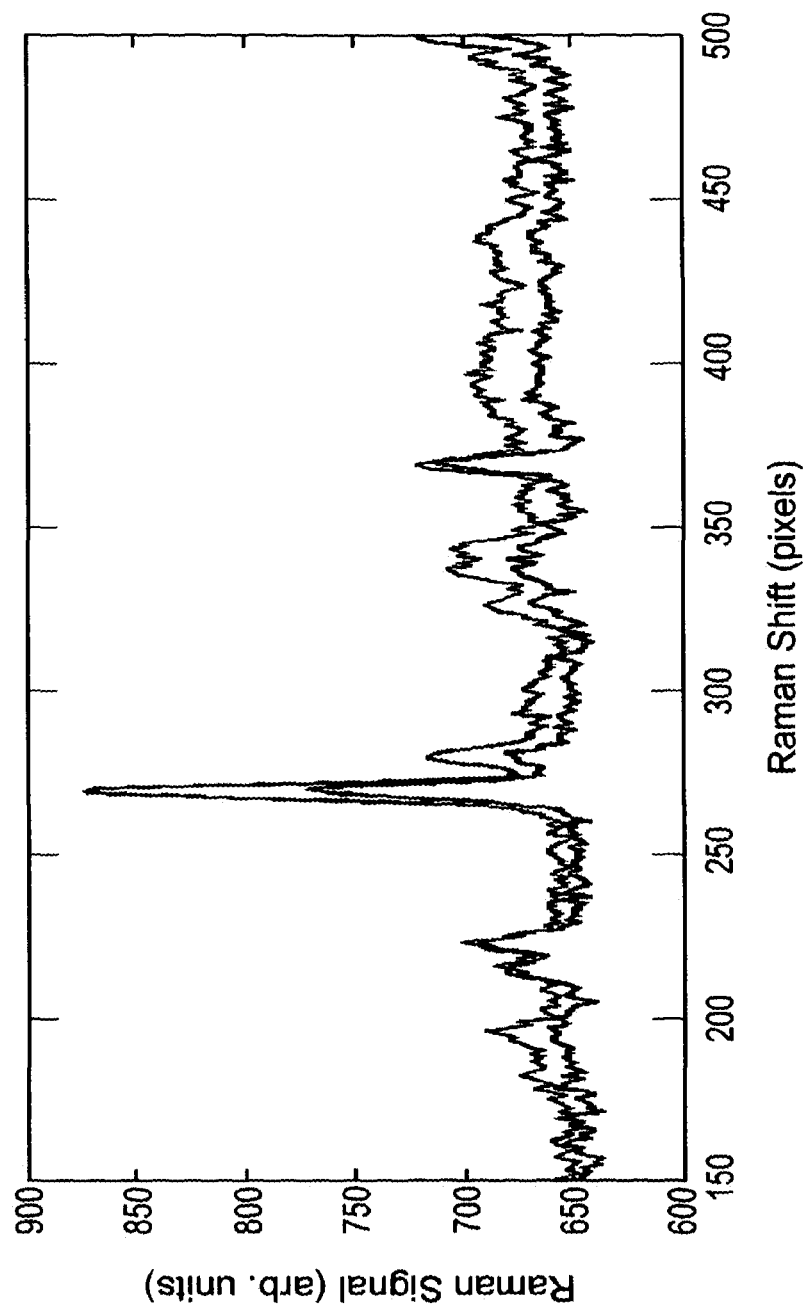
FIG. 13 shows the effect of the SLM on the Raman spectral signal.

The first possibility corresponds to the optimisation of the excitation beam by changing the beam profile to correspond to the QME beam that gives the highest excitation possible. Similarly to the photoporation case, this can be done by including a spatial light modulator, or any other complex phasefront-modulating device, on the beam path of the excitation laser. This SLM displays the phase and amplitude mask that creates the QME beam on the sample. An example of a system for implementing this is shown in FIG. 12. This illustrates a typical Raman set-up including a spatial light modulator on the excitation part of the set-up. Using the SLM, the incident beam can be modified to create the spectroscopic excitation QME beam incident on the sample giving rise to the optimal excitation profile. FIG. 13 shows the effect of the SLM on the Raman spectral signal. Using the QME method to determine the mask optimising the Raman signal or any other spectroscopic signal delivers the best possible spectroscopic signal.

The second method for using QME optimisation to improve spectroscopic acquisitions is implemented on the collection arm of the spectrometer (after the PBS beam splitter in FIG. 9). In this case, the excitation beam is kept constant and the coupling to the spectrometer/CCD camera that is optimised by modulating the collection of the spectroscopic light field (Raman signal, fluorescence, multi-photon fluorescence for example). In practical terms, the spectroscopic signal forms a quadratic measure that is optimised through the experimental QME procedure outlined above or through the theoretical QME procedure if the whole system can be numerically simulated.

The QME method can be also applied for imaging. This is a method that forms the image of an object using light that does not interact with the observed sample. The QME indirect imaging method is able to image both amplitude and phase information from a target that is not directly illuminated by the imaging beam. The method involves illuminating a target with a plurality of wavefunctions; capturing light that has interacted with the target; decomposing the captured light into a plurality of wavefunctions that together describe the target; determining a relationship between the superimposed wavefunctions and a quadratic measure; using the determined relationship to identify the superimposed wavefunctions that provide a desired or optimised quadratic measure, and using the identified superimposed wavefunctions to create an image of the target. In this way, an improved image of the target can be obtained.

Figure 14:
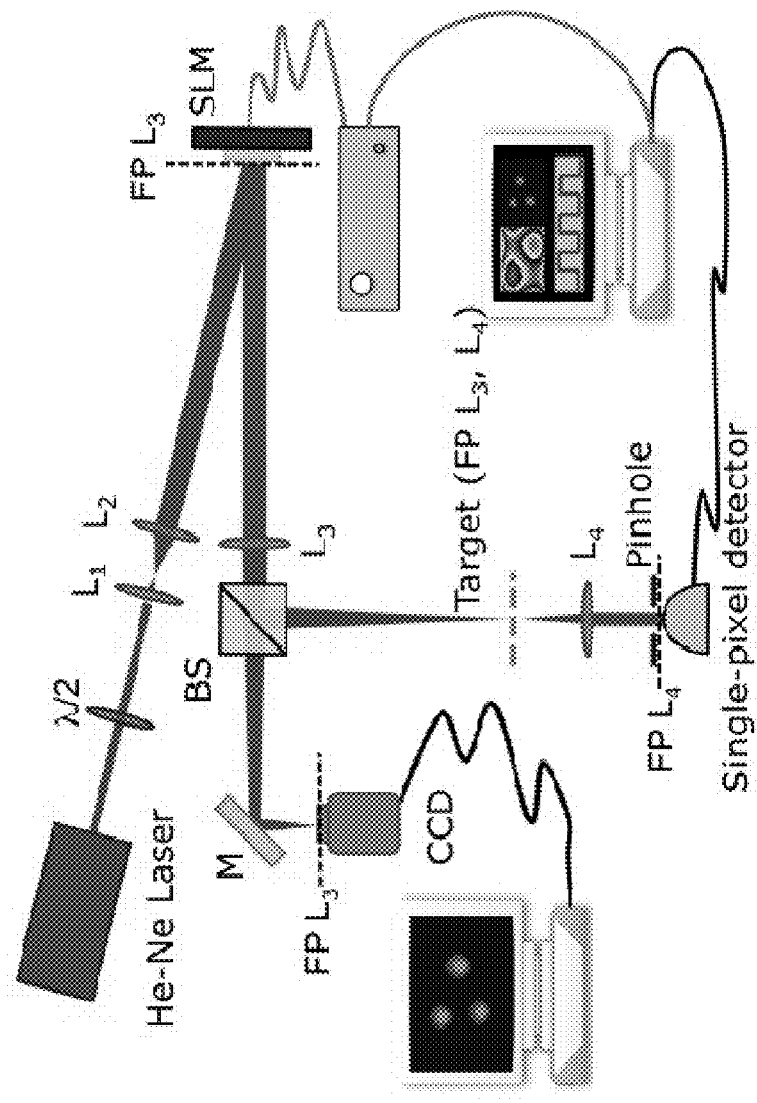
FIG. 14 is a schematic diagram of an experimental set-up used to perform indirect imaging with optical eigenmode formalism.

FIG. 14 shows the experimental set-up used to perform indirect imaging with optical eigenmode formalism. This has a laser and a SLM. Light from the laser is incident on the SLM, and is passed to a beam splitter where it is split into two different beams. One beam does not interact with the target, but illuminates a high-resolution CCD camera (multi-pixel detector). The other beam interrogates, in transmission, the target (or sample) and then illuminates a photo-diode (single-pixel detector) providing no spatial resolution. The transmission wave-front of this beam is decomposed, using an optical lock-in amplification technique, onto an orthogonal set of optical eigenmodes. The lock-in amplification corresponds to performing a first order cross-correlation leading to the retention of the phase information of the object. This approach foregoes point-by-point scanning and allows a rapid full field image extraction.

Here, to define the intensity optical eigenmodes, a linearly polarised electromagnetic field E is decomposed into a superposition of N monochromatic ($e^{i\omega t}$) "test" fields:

$$E = a^*_j E_j; E^* = E^*_k a_k \quad (13)$$

The field intensity $m^{(i)}$ is integrated over a region of interest (ROI), as defined by:

$$m^{(l)}(E) = \int_{ROI} d\sigma E \cdot E^* = a^*_j M_{ij} a_k \quad (14)$$

valid for linearly polarised light and not tightly-focused beams. The ROI represents the detector active area. The elements $M_{ij}$ are constructed by combining the fields $E_j$ and $E_k$ for j,k=1, 2 ... N. The optical eigenmodes are defined by:

$$A_l = \frac{1}{\sqrt{\lambda^l}} v^*_{lj} E_j;$$

$$A^*_l = \frac{1}{\sqrt{\lambda^l}} v_{lj} E^*_j,$$

with $$M_{jk} v_{lj} = \lambda^l v_{lk}$$

An unknown field T can be decomposed onto the eigenmodes using its projection defined by:

$$c^*_l = \int_{ROI} d\sigma T \cdot A^*_l$$

where $c_l$ corresponds to the complex decomposition coefficients of the field T in optical eigenmodes base $E_l$.

If the $E_l$ fields form a complete base, the unknown field T can be reconstructed from the projection using $T = c^*_l \cdot A_l$.

Figure 15:
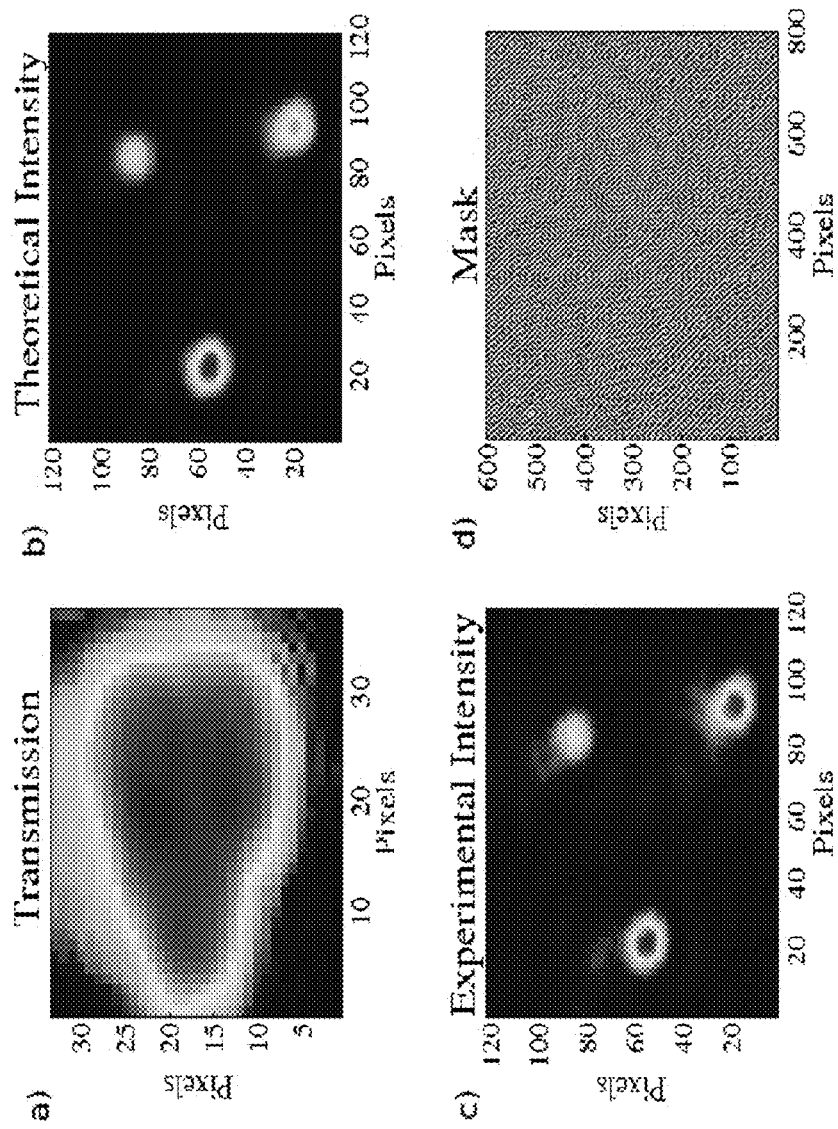
FIG. 15 shows an image of a target using a conventional imaging technique and an indirect QME based imaging technique.

FIG. 15(a) shows the conventional transmission intensity from the target, consisting of three holes of ~200 μm, detected by the single-pixel detector for each scan position. By contrast, FIG. 15(b) and FIG. 15(c) show the indirect image obtained, respectively through numerical and experimental optical eigenmodes superposition. The latter was produced using the SLM mask of FIG. 14.

The QME method described above simplifies first-order and second-order correlation functions. Using the optical eigenmodes method in conjunction with the first, second and higher order correlation functions, it is possible to create superpositions of waves that are detected exclusively by one set of detectors while none of the waves is detected by the complementary set. The method can be illustrated considering the following properties:

$$G^{(1)}(\tau) = \int_{ROI} \langle E(t) E^*(t+\tau) \rangle d\sigma = e^{i\omega t} \langle a^*_j M_{jk} a_k \rangle = \sum_{jk} G^1_{jk}(\tau)$$

with $$G^{(1)}_{jk}(\tau) = \int_{ROI} \langle A_j(t) A^*_k(t+\tau) \rangle d\sigma = e^{i\omega t} \delta_{jk}$$

where

< ... > indicates ensemble averaging

This relationship shows that the optical eigenmodes are independent with respect to the first-order correlation function.

The second-order correlation function between two different detectors (D1 and D2) can be represented as:

$$G^{(2)} = \langle (a^*_j M^{(1)}_{jk} a_k)(a^*_j M^{(2)}_{jk} a_k) \rangle$$

where the measures $(a^*_j M_{jk}^{(1)} a_k)$ and $(a^*_j M_{jk}^{(2)} a_k)$ correspond to the intensity for each detector. Further, the matrix operators for each detector $M_{jk}^{(1)}$ and $M_{jk}^{(2)}$ can represented in the reciprocal null space as:

$$N_{im}^{(1)} = (v_{ji}^{(2)})^* M_{jk}^{(1)} v_{km}^{(2)}; N_{im}^{(2)} = (v_{ji}^{(1)})^* M_{jk}^{(2)} v_{km}^{(1)}$$

where $v_{im}^{(1)}$ and $v_{im}^{(2)}$ are the orthonormal representation of the nullspace of $M_{jk}^{(1)}$ and $M_{jk}^{(2)}$, respectively. In other words, $v_{km}^{(1)}$ and $v_{km}^{(2)}$ correspond to the eigenvectors of $M_{jk}^{(1)}$ and $M_{km}^{(2)}$ having zero eigenvalues. These vectors describe optical modes whose intensities are localised on at most one of the two detectors. Within this base, it is possible to defined two new sets, $u_{ik}^{(1)}$ and $u_{ik}^{(2)}$ of optical eigenmodes:

$$N_{im}^{(1)} u_{mk}^{(1)} = \lambda_{(1)}^k u_{ik}^{(1)}; N_{im}^{(2)} u_{mk}^{(2)} = \lambda_{(2)}^k u_{ik}^{(2)}$$

where the first set $u_{ik}^{(1)}$ forms an orthogonal base with respect to detector D1 while any superposition of vectors from this base induce no measure on detector D2 (and vice-versa). Using these optical eigenmodes, it is possible to describe four distinct possible interactions: no field on either detector, field only on detector D1, field only on detector D2 and field on both detectors. The latter case can be described by the optical eigenmodes of $M_{ik} = M_{ik}^{(1)} + M_{ik}^{(2)}$ after removing the contributions from the first three cases. Further, the second order correlation function $G^{(2)}$ is zero for any optical eigenmode taken from either of the first three cases and non-zero for the fourth case.

The QME method can also be applied in the presence of partial coherent light. This is important as it allows fluctuations or perturbations of the incoming light field to be corrected and improves locally the beam quality of a laser beam. Indeed, an important question, for practical applications, is that of the behaviour of the smallest spot eigenmode when perturbed. One method to simulate this behaviour is via a Gaussian shell model describing the propagation of partially coherent light. Using this formalism, the effect of the loss of spatial coherence onto the smallest spot size achievable has been numerically simulated.

Figure 16:
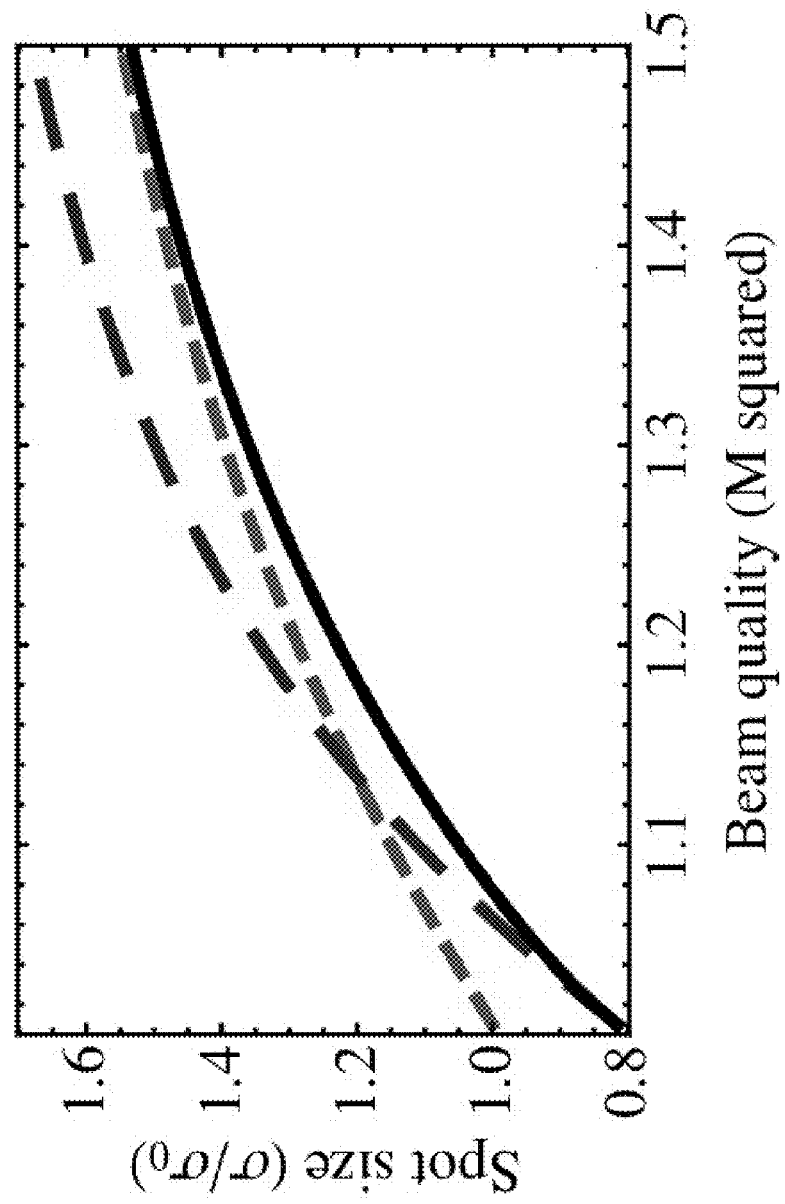
FIG. 16 shows a numerically simulated plot of spot size for various beams as a function of the incident beam quality factor (M squared)

FIG. 16 shows the numerically simulated evolution of an Airy disk (short dash) and smallest spot eigenmode optimized for perfectly coherent light (long dash) as the function of the incident beam quality factor (M squared). Both spots increase in size with the eigenmode spot losing its advantage faster then the Airy disk. This can be understood through the "diffusion" of the sidebands into the ROI destroying the sub-wavelength spot as the light field loses coherence. FIG. 16 also shows an optical eigenmode (continuous) that minimizes the spot size taking into account the precise coherence length of the incident light. This is possible as the description of the intensity within the Gaussian shell model remains quadratic with respect to the field. For any given degree of coherence, there exists an eigenmode beam that focusses light better then the Airy disk, and thus correcting for the loss of coherence.

The QME method can be used to maximise transmission/reflection through structured materials (photonic crystals, meta-materials, turbid media, nano-antennas). As in the case of determining the best beam for spectroscopic excitation, it is possible to determine the eigenmode of the light field that has the largest or smallest transmission, reflection, diffraction or scattering from an optical or opto-electrical device. The principle of the QME method is the same as described for the other methods except that the quadratic measure to be optimised needs to be changed. Optimising the transmission corresponds to the intensity operator QME measured after the device, while optimising the reflectivity would correspond to the measure on the incident side of the device.

Figure 17A:
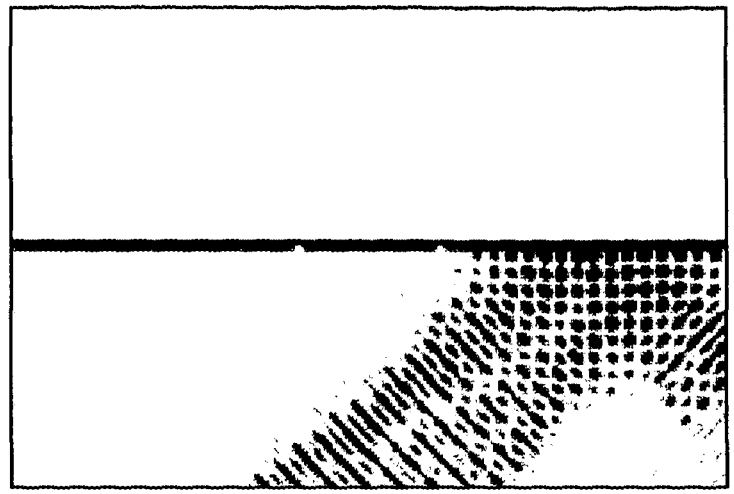
FIG. 17(a) shows an incident optical field on a double slit.
Figure 17B:
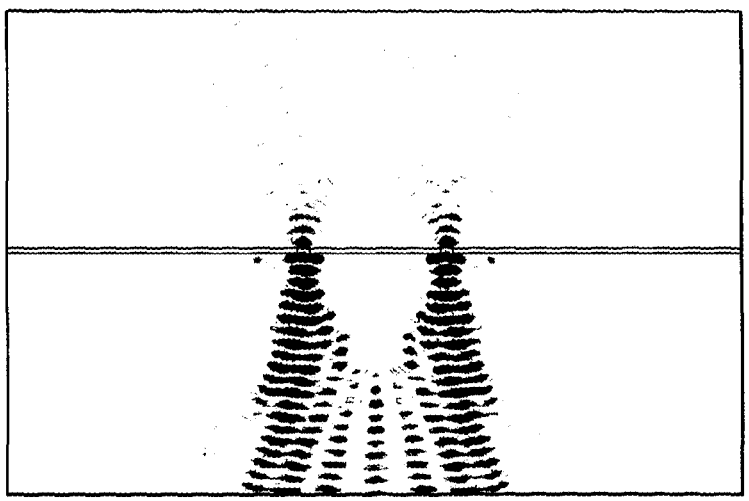
FIG. 17(b) shows the corresponding eigenmode of the transmission operator with the highest intensity.

FIG. 17(a) shows a single obliquely incident optical field on a double slit. The structure, here the double slit, is probed by a succession of incident fields each with a different angle. The quadratic measure operator is determined by considering the transmitted field intensity (which is quadratic in the field) after the double slit. FIG. 17(b) shows the eigenmode of the transmission operator with the highest intensity corresponds to the superposition of the probe fields shown on the right.

The absorption can also be optimised by simply using the measure of the overall loss of the device under certain illumination. More complicated configurations can also be taken into account. For example, an absorbing nano-particle could be added to the two slit geometry in FIG. 17. The QME method could then be used to optimise the amount of absorbed light by this nano-particle while positioning the nano-particle after the two slits. In the case of a regular or non-regular arrangement of nano-devices the region of interest and the choice of the focal spot of the QME operator can be used to switch on and off the illumination off specific devices.

The sub-diffraction focussing capabilities of the QME method is based on the superposition of fields such that the beam spot size, as defined by the quadratic measure operator, is minimised by its eigenmode. This process can be inverted and used to image objects with resolution below the diffraction limit. Multiple methods for inverting the process can be considered such as, but not limited to creating a sub-diffraction spot using the QME method and using this sub-diffraction spot to illuminate a sample that is scanned. In this case, it is important that the region of interest is chosen such that it is possible to distinguish between the tightly focussed beam from the QME sidebands.

Another approach is to use the field modulation on the imaging side of the set-up. In this case, the object is replaced by a calibrating pinhole acting as a point source. The field-modulating device such as an SLM is then used to create on a CCD camera the tightest spot possible from the light originating from the pinhole in the object plane. Replacing the pinhole with the object under consideration makes it possible to image the part of the object that is within the region of interest (here field of view) with a sub-diffraction resolution. Here, the illumination is restricted to this region of interest, so the QME sidebands do not interfere with the image.

In the case of telescopes, it is possible to use directly the light from one star to determine the spot size QME. Here, the procedure is the same as for the microscope. The mask that needs to be displayed on the SLM can be measured by considering a base of masks and measuring the image size of the light from the star. The QME mask provides the smallest image possible and this mask can be used to resolve objects (such as binary stars) that are beyond the standard diffraction limit.

In FIG. 17, the intensity eigenmode optimising the transmission for the double slit considered has intrinsic information about the optical properties of the illuminated device (in this case the double slit). Indeed, the incident QME field takes, by its nature, the shape, size and "image" of the illuminated device into account. Consequently, the structured illumination described above can be used to image indirectly sub-diffraction objects.

Nonlinear multi-photon processes can also be used in order to create sub-diffraction images of a sample of interest. One such method uses then optical saturation of the sample to create a saturated ring enclosing a dark region that can subsequently be probed. The saturated region does not contribute to the subsequent signal while one only receives a signal from the dark region. The QME method can be used to create an optimised dark spot, having the smallest extent possible or having a specific depth.

The QME method can be also employed to improve determination of the optimum beam for tweezing and trapping particles and nano particles. Indeed, the momentum transfer (optical forces) on these microscopic objects if quadratic with respect to the incident fields and can be represented as a quadratic measure associated with a momentum transfer operator. The eigevectors of this operator are QME of the light field and correspond to the optimal optical forces acting on a particle. To apply the QME method to trapping, tweezing and micromanipulation (such as clearing an area of interest and volume clearing of micro- and nano-objects, condensing of particles, rotating and spin of microscopic objects) it is necessary to employ a multi step approach.

The first step defines the normalisation measure. There are two options. The optimisation is done for the same incident power or the optimisation is done for the same absorbed power (in the case of metallic nano-particles for example). In this first step, the probing fields are determined to be orthogonal and normalised with respect to one of these two operators. In a second step, the modes considered are chosen such that the symmetry of the problem is taken into account. For example, optimising the trapping potential implies the optical force acting on the particle to be zero when the particle is in the trap position. This can be done by determining the null-space of the optical force operator. Finally, using the normalised symmetric base, it is possible to describe the trap stiffness or the area and volume clearing strength as a quadratic measure of the system. The QME of this measure gives directly the optical field associated with micromanipulation considered. In the case of composite objects, such as nano-particles manipulated with the help of nano-antennas or other microscopic devices or structures, it is possible to optimise the trapping with respect to the absorption of the manipulating devices (e.g. the nano-antennas or other microscopic devices) by simply changing step one of the process.

As described above, modulating devices such as spatial light modulators can be used to create the QME light profiles. The eigenmodes of light can also be creating through structured materials such as photonic crystals, photonic crystal waveguides, plasmonic structures and arrays nano-holes. These devices act on the propagation of light through scattering, interference and absorption. As such, determining theoretically or experimentally the QME of the light field that optimises a specific measure, it is possible to create this eigenmode of light through the use of one of the device mentioned above. A simple example corresponds to the light field transmitted through an arrangement of variable sized nano apertures.

The QME method relies on the control of the phase and amplitude of a superposition of fields. In the case of the nano-hole array, it can be seen that the hole size determining the amplitude while the precise position of the hole the phase of the wavelet originating from this hole. Using this point like an arrangement of point like sources that are distributed in a plane as the bases for the QME operator, it is possible to implement the QME field by correctly designing the sizes and positions of the nano holes.

Figure 18:
FIG. 18 shows an intensity profile of propagation and orbital eigenmodes of light for a multimode square perfect waveguide.
Figure 18:
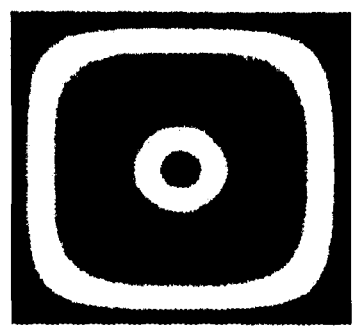
Figure 18:
Figure 18:

The transmission of the data through optical fibre in telecommunication replies on the encoding of binary data on the optical light field. Multi-mode fibres have the potential of carrying more data as each mode of the fibre can encode a different stream of data. Unfortunately, during long distance propagation these modes couple together and cross talk occurs. The QME approach makes it possible to experimentally define an output orthogonal set of modes, which can be coupled to via structured illumination on the input of the fibre. This enables the elimination of crosstalk between the channels and increases the amount of data streams possible to encode for transmission. FIG. 18 shows a set of such modes for a perfect square fibre. In particular, FIG. 18 shows the intensity profile of the propagation and orbital eigenmodes of light for a multimode square perfect waveguide. The QME method delivers the modes of light that the same time are propagation invariant and have a clearly defined orbital angular momentum. These modes are orthogonal to each other and can be used to independently encode different data streams.

Many quantum optical based applications such as quantum key encryptions and distribution, teleportation and entanglement are based on the precise engineering of the electromagnetic fields. The QME method allows the optimisation of these fields to achieve highest quantum efficiency possible. For example: many quantum systems and devices are based on the creation of entangled photon pairs in non-linear optical crystals. These crystals are typically excited by a pump laser, whose photons are split into the entangled pairs in a non-linear process. The QME method can be used to determine the best possible excitation beam profile to achieve the larges conversion efficiency delivering a reliable source of entangled photons. This same approach can also be used in the case of atom trapping and cooling.

A skilled person will appreciate that variations of the disclosed arrangements are possible without departing from the invention. Whilst the experiments described above use a dynamic diffractive optical element, i.e. a SLM, it will be appreciated that one or more elements having fixed characteristics could equally be used. For example, a simple holographic element could be designed to have the diffractive properties suitable for altering beam size or characteristics over a region on interest. A range of such simple elements could be provided, each adapted to provide a pre-determined spot size. Such elements could be provided for use with a conventional microscope, so that when necessary the spot size can be reduced below sizes normally achievable merely by inserting the specially designed element in the optical beam path. Accordingly, the above description of the specific embodiment is made by way of example only and not for the purposes of limitation. It will be clear to the skilled person that minor modifications may be made without significant changes to the operation described.

The invention claimed is:

1. A method of optimizing in an optical system that has a laser, at least one measure of an optical output from the optical system that is a quadratic function of a wavefunction, the method comprising:
   superimposing a plurality of wavefunctions;
   determining a relationship between the superimposed wavefunctions and the quadratic measure;

identifying, using a computer processor, the superimposed wavefunctions that provide a desired or optimized quadratic optical measure using the determined relationship; and generating, using light from the laser and at least one optical component, the identified superimposed wavefunctions that provide the desired or optimized quadratic optical measure.

2. A method as claimed in claim 1 wherein each superposition of wavefunctions has an amplitude and/or phase, and the method involves using the amplitude and/or phase to determine a relationship or function between superimposed wavefunctions and the quadratic measure.

3. A method as claimed in claim 2 wherein the relationship or function is a linear relationship or function of the wavefunction.

4. A method as claimed in claim 3, wherein the linear relationship is decomposed or transformed to be represented by a series of eigenvectors/eigenvalues.

5. A method as claimed in claim 4, wherein the optimized or desired measure is selected by choosing the maximum or minimum magnitude eigenvalue.

6. A method as claimed in claim 3 wherein the linear function is a linear operator of the wavefunction.

7. A method as claimed in claim 6 wherein the linear operator comprises a square matrix where each element is given by the quadratic measure corresponding to all the superpostions of the wavefunctions considered, to form a n by n matrix where n is the number of wavefunctions considered.

8. A method as claimed in claim 1 where constraints and/or symmetries are applied.

9. A method as claimed in claim 8 wherein one parameter is constrained to be constant and another optimized within that constraint.

10. A method as claimed in claim 9, wherein intensity is constrained to be constant and spot size is minimized within that constraint.

11. A method as claimed in claim 1 comprising defining a region of interest and determining the relationship between the superimposed wavefunctions and the quadratic measure within the region of interest.

12. A method as claimed in claim 11 wherein the region of interest is user defined.

13. A method as claimed in claim 1 wherein the quadratic measure is selected from: spot size; energy; intensity; power; momentum; circular spin.

14. A method as claimed in claim 1 wherein the wavefunctions are orthogonal.

15. A method as claimed in claim 1 wherein the wavefunctions are electromagnetic wavefunctions.

16. A method as claimed in claim 1 wherein the method is carried out computationally to identify the superimposed wavefunctions that provide a desired or optimized quadratic measure.

17. A method as claimed in claim 1 wherein the method is carried out experimentally to identify the superimposed wavefunctions that provide a desired or optimized quadratic measure.

18. A computer program product for optimizing in an optical system that has a laser, at least one measure of an optical output from the optical system that is a quadratic function of a wavefunction, the computer program product located on a non-transitory computer readable medium comprising instructions for operation by a computing device, said instructions comprising:

instructions configured for superimposing a plurality of wavefunctions;

instructions configured for determining a relationship between the superimposed wavefunctions and the quadratic measure;

instructions configured for identifying the superimposed wavefunctions that provide a desired or optimized quadratic optical measure using the determined relationship; and instructions configured for generating, using light from a laser and at least one optical component, the identified superimposed wavefunctions that provide the desired or optimized quadratic optical measure.

19. A device adapted to cause superposition of a plurality of wavefunctions, so as to optimize a quadratic measure, the plurality of wavefunctions being determined using the following operations by said device:

superimposing a plurality of wavefunctions;

determining a relationship between the superimposed wavefunctions and the quadratic measure;

identifying the superimposed wavefunctions that provide a desired or optimized quadratic optical measure using the determined relationship; and generating, using light from a laser, the identified superimposed wavefunctions that provide the desired or optimized quadratic optical measure.

20. A device as claimed in claim 19 comprising a diffractive optical element adapted to create the optimized plurality of wavefunctions.

21. A device as claimed in claim 19 adapted to create a sub-diffraction limit spot size.

22. A method for forming an image in an optical system that has a laser, the method comprising:

illuminating a target with a plurality of wavefunctions;

capturing light that has interacted with the target;

decomposing the captured light into a plurality of wavefunctions that together describe the target;

determining a relationship between the superimposed wavefunctions and a quadratic measure;

identifying the superimposed wavefunctions that provide a desired or optimized quadratic optical measure using the determined relationship; and using the identified superimposed wavefunctions to create an image of the target.

23. A method as claimed in claim 22 wherein the light captured is transmitted through or reflected from or scattered from the target.

24. A method as claimed in claim 22, wherein the wavefunctions are electromagnetic wavefunctions.

25. A computer-implemented method of optimizing a spot size of an optical beam, the method comprising:

superimposing a plurality of wavefunctions;

determining, using a computer processor, a relationship between the superimposed wavefunctions and the spot size;

identifying, using a computer processor, the superimposed wavefunctions that provide a desired or optimized spot size using the determined relationship; and generating, using a laser, the identified superimposed wavefunctions that provide the desired or optimized spot size.

26. The computer-implemented method as claimed in claim 25, wherein the optimized spot size is below a diffraction limit.

27. The computer-implemented method as claimed in claim 25, wherein the optimized spot size is a focal point spot size and the focal point spot size is below a diffraction limit.

28. A computer-implemented method of optimizing, in an optical trapping system, at least one measure of an optical trap that is a quadratic function of a wavefunction, the method comprising:

superimposing a plurality of wavefunctions for forming an optical trap;

determining, using a computer processor, a relationship between the superimposed wavefunctions and the optical trap quadratic measure;

identifying, using a computer processor, the superimposed wavefunctions that provide a desired or optimized optical trap quadratic measure using the determined relationship; and generating, using a laser, an optical trap for trapping at least one particle, using the identified superimposed wavefunctions that provide the desired or optimized optical trap quadratic measure.

29. A device adapted to optimizing a spot size of an optical beam using the following operations:

superimposing a plurality of wavefunctions;

determining, using a computer processor, a relationship between the superimposed wavefunctions and the spot size;

identifying, using a computer processor, the superimposed wavefunctions that provide a desired or optimized spot size using the determined relationship; and generating, using a laser, the identified superimposed wavefunctions that provide the desired or optimized spot size.

30. A device as claimed in claim 29, wherein the optimized spot size is below a diffraction limit.

31. A device as claimed in claim 29, wherein the optimized spot size is a focal point spot size and the focal point spot size is below a diffraction limit.

32. A device for optimizing, in an optical trapping system, at least one measure of an optical trap that is a quadratic function of a wavefunction using the following operations:

superimposing a plurality of wavefunctions for forming an optical trap;

determining, using a computer processor, a relationship between the superimposed wavefunctions and the optical trap quadratic measure;

identifying, using a computer processor, the superimposed wavefunctions that provide a desired or optimized optical trap quadratic measure using the determined relationship; and generating, using a laser, an optical trap for trapping at least one particle, using the identified superimposed wavefunctions that provide the desired or optimized optical trap quadratic measure.

* * * * *